United States Patent
Mittal et al.

(10) Patent No.: US 10,832,171 B2
(45) Date of Patent: Nov. 10, 2020

(54) SYSTEM AND METHOD FOR DATA VISUALIZATION USING MACHINE LEARNING AND AUTOMATIC INSIGHT OF OUTLIERS ASSOCIATED WITH A SET OF DATA

(71) Applicant: ORACLE INTERNATIONAL CORPORATION, Redwood Shores, CA (US)

(72) Inventors: Ashish Mittal, Foster City, CA (US); Victor Belyaev, San Jose, CA (US); Steve Simon Joseph Fernandez, Columbia, MO (US); Gabby Rubin, Sunnyvale, CA (US); Alextair Mascarenhas, Foster City, CA (US); Samar Lotia, Cupertino, CA (US); Alvin Raj, Woburn, MA (US); John Fuller, Chicago, IL (US); Saugata Chowdhury, Sunnyvale, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 16/148,680

(22) Filed: Oct. 1, 2018

(65) Prior Publication Data

US 2019/0102921 A1    Apr. 4, 2019

Related U.S. Application Data

(60) Provisional application No. 62/566,263, filed on Sep. 29, 2017, provisional application No. 62/566,264, (Continued)

(51) Int. Cl.
*G06N 20/00* (2019.01)
*G06F 16/248* (2019.01)
(Continued)

(52) U.S. Cl.
CPC ........... *G06N 20/00* (2019.01); *G06F 3/0481* (2013.01); *G06F 3/0486* (2013.01);
(Continued)

(58) Field of Classification Search
None
See application file for complete search history.

(56) References Cited

U.S. PATENT DOCUMENTS

| | | | |
|---|---|---|---|
| 8,522,151 B2 | 8/2013 | Robertson et al. | |
| 9,024,952 B2 | 5/2015 | Mital et al. | |

(Continued)

OTHER PUBLICATIONS

Raj et al "Accessing Big Data in the Cloud Using Mobile Devices", chap. 18, Handbook of Research on Cloud Infrastructures for Big Data Analytics, 2014. (Year: 2014).*

(Continued)

*Primary Examiner* — Patrick F Valdez
(74) *Attorney, Agent, or Firm* — Tucker Ellis LLP

(57) ABSTRACT

In accordance with various embodiments, described herein are systems and methods for use of computer-implemented machine learning to automatically determine insights of facts, segments, outliers, or other information associated with a set of data, for use in generating visualizations of the data. In accordance with an embodiment, the system can use a machine learning process to automatically determine one or more outliers or findings within the data, based on, for example, determining a plurality of combinations representing pairs of attribute dimensions within a data set, from which a general explanation or pattern can be determined for one or more attributes, and then comparing particular values for attributes, with the determined pattern for those attributes. Information describing such outliers or findings can be graphically displayed at a user interface, as text, graphs, charts, or other types of visualizations, and used as a starting point for further analysis of the data set.

12 Claims, 28 Drawing Sheets

Related U.S. Application Data filed on Sep. 29, 2017, provisional application No. 62/566,265, filed on Sep. 29, 2017, provisional application No. 62/566,271, filed on Sep. 29, 2017.

(51) Int. Cl.

| | |
|---|---|
| *G06F 16/25* | (2019.01) |
| *G06F 16/26* | (2019.01) |
| *G06F 3/0481* | (2013.01) |
| *G06F 3/0486* | (2013.01) |
| *G06T 11/20* | (2006.01) |
| *G06F 16/22* | (2019.01) |

(52) U.S. Cl.
CPC ........ *G06F 16/2272* (2019.01); *G06F 16/248* (2019.01); *G06F 16/252* (2019.01); *G06F 16/26* (2019.01); *G06T 11/206* (2013.01); *G06T 2200/24* (2013.01)

(56) References Cited

U.S. PATENT DOCUMENTS

| | | | |
|---|---|---|---|
| 9,589,233 B2 | 3/2017 | Peev et al. | |
| 9,613,102 B2 | 4/2017 | Anand et al. | |
| 9,715,331 B2 | 7/2017 | Dewan et al. | |
| 10,025,813 B1* | 7/2018 | Gebremariam | G06F 16/2365 |
| 10,515,121 B1 | 12/2019 | Setlur | |
| 2003/0018601 A1 | 1/2003 | Lee | |
| 2008/0022232 A1 | 1/2008 | McConaghy | |
| 2012/0011119 A1 | 1/2012 | Baheti | |
| 2014/0071138 A1 | 3/2014 | Gibson et al. | |
| 2014/0156649 A1* | 6/2014 | Bhattacharjee | G06F 16/24578 |
| | | | 707/723 |
| 2014/0358825 A1 | 12/2014 | Phillipps | |
| 2014/0372346 A1 | 12/2014 | Phillipps | |
| 2015/0205695 A1 | 7/2015 | Sengupta et al. | |
| 2015/0317337 A1 | 11/2015 | Edgar | |
| 2016/0092408 A1* | 3/2016 | Lagerblad | G06F 3/04842 |
| | | | 715/243 |
| 2016/0188598 A1* | 6/2016 | Moser | G06F 3/0482 |
| | | | 707/723 |
| 2017/0169094 A1 | 6/2017 | Gibson | |
| 2017/0177559 A1 | 6/2017 | Dang et al. | |
| 2017/0200205 A1* | 7/2017 | Liu | G06Q 30/0282 |
| 2017/0235466 A1 | 8/2017 | Tanwir et al. | |
| 2018/0129373 A1* | 5/2018 | Ellis | G06F 3/0482 |
| 2019/0065014 A1* | 2/2019 | Richter | G06T 11/206 |

OTHER PUBLICATIONS

Choy, Carmen, "What's New in SAP Analytics Cloud (formerly BusinessObjects Cloud) and SAP Digital Boardroom Release Sep. 2017" published May 19, 2017, retrieved on Jan. 3, 2018 from https://tinyurl.com/y7whbv5w, 6 pages.
"Data Integration and Machine Learning for Deeper Customer Insights", retrieved on Dec. 28, 2017 from https://dzone.com/articles/data-integration-and-machine-learning-for-deeper-c, 4 pages.
"IBM Kenexa Smarter Workforce Knowledge Center—Getting started with predicting", retrieved on Jan. 2, 2018 from https://goo.gl/AVhBkj, 1 page.
"IBM Kenexa Smarter Workforce Knowledge Center—Predict", retrieved on Jan. 2, 2018 from https://goo.gl/R8ciyu, 1 page.
"IBM Knowledge Center—Exploring a decision tree visualization", retrieved on Jan. 2, 2018 from https://goo.gl/AjSWkQ, 3 pages.
"IBM Knowledge Center—Exploring a spiral visualization", Watson Analytics, retrieved on Dec. 28, 2017 from https://www.ibm.com/support/knowledgecenter/en/SS4QC9/com.ibm.solutions.wa_an_overview.2.0.0.doc/wa_discover_viz_spiral_explore.html, 3 pages.
"IBM Watson Analytics", retrieved on Dec. 28, 2017 from https://www.ibm.com/in-en/marketplace/watson-analytics, 1 page.
"IBM Watson Analytics", retrieved on Dec. 28, 2017 from https://www.ibm.com/in-en/marketplace/watson-analytics/details#product-header-top, 2 pages.
"IBM Watson Analytics—Exploring a prediction", retrieved on Jan. 2, 2018 from https://goo.gl/ceaqVU, 3 pages.
"IBM Watson Analytics—Overview", retrieved on Jan. 2, 2018 from https://goo.gl/g64wxS, 1 page.
"Predicting with Watson Analytics: A quick start guide", retrieved Dec. 28, 2017 from https://www.ibm.com/commmunities/analytics/watson-analytics-blog/predicting-with-watson-analytics-a-quick-start-guide/, 9 pages.
"Realize the Power of Predictive Analytics in Just 4 Steps", retrieved Dec. 28, 2017 from https://www.ibm/com/communities/analytics/watson-analytics-blog/watson-analytics-use-case-predictive-analytics-in-4-easy-steps/, 4 pages.
"SAP Analytics Cloud—End-to-end analytics platform", retrieved on Jan. 3, 2018 from https://www.sapanalytics.cloud/, 2 pages.
"Smart Insights", retrieved on Jan. 2, 2018 from https://tinyurl.com/y7vfln5y, 1 page.
Stacker IV, McKinley, "Predicting with Watson Analytics: A quick start guide", published Dec. 13, 2014, retrieved on Jan. 2, 2018 from https://goo.gl/4TFL84, 9 pages.
"What's New in SAP Analytics Cloud (Release Sep. 2017)—SAP Analytics", retrieved Jan. 2, 2018 from https://tinyurl.com/y9z6obdm, 7 pages.

* cited by examiner

SYSTEM AND METHOD FOR DATA VISUALIZATION USING MACHINE LEARNING AND AUTOMATIC INSIGHT OF OUTLIERS ASSOCIATED WITH A SET OF DATA

CLAIM OF PRIORITY

This application claims the benefit of priority to U.S. Provisional Applications titled "SYSTEM AND METHOD FOR DATA VISUALIZATION USING AUTOMATIC INSIGHT OF BASIC FACTS", Application No. 62/566,263, filed Sep. 29, 2017; "SYSTEM AND METHOD FOR DATA VISUALIZATION USING AUTOMATIC INSIGHT OF SEGMENTS", Application No. 62/566,264, filed Sep. 29, 2017; "SYSTEM AND METHOD FOR DATA VISUALIZATION USING AUTOMATIC INSIGHT OF OUTLIERS", Application No. 62/566,265, filed Sep. 29, 2017; and "SYSTEM AND METHOD FOR AUTOMATIC DETERMINATION OF DATA VISUALIZATION ALGORITHMS", Application No. 62/566,271, filed Sep. 29, 2017; each of which above applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments described herein are generally directed to systems and methods for use of machine learning to automatically determine insights of facts, segments, outliers, or other information associated with a set of data, for use in generating visualizations of the data.

BACKGROUND

Data visualization generally refers to the graphical display, presentation, or communication of information associated with a set of data.

For example, a data visualization environment can enable a user to create and display text, graphs, charts, or other types of visualizations that effectively present patterns, trends, or other meaningful information associated with the set of data, and which might otherwise be less discernable using traditional data reporting mechanisms, such as tables or spreadsheets.

However, a large data set may encompass hundreds of columns associated with data attributes, and millions of data points. Developing visualizations for use with such a large data set may require the skill of an experienced data scientist, to assess and manipulate different types and combinations of data attributes, and determine which particular data attributes or types of visualizations best explains a particular target attribute. This manual process can be time-consuming and require substantial effort for an ordinary business user.

SUMMARY

In accordance with various embodiments, described herein are systems and methods for use of computer-implemented machine learning to automatically determine insights of facts, segments, outliers, or other information associated with a set of data, for use in generating visualizations of the data.

In accordance with an embodiment, the system can use a machine learning process to automatically determine one or more outliers or findings within the data, based on, for example, determining a plurality of combinations representing pairs of attribute dimensions within a data set, from which a general explanation or pattern can be determined for one or more attributes, and then comparing particular values for attributes, with the determined pattern for those attributes. Information describing such outliers or findings can be graphically displayed at a user interface, as text, graphs, charts, or other types of visualizations, and used as a starting point for further analysis of the data set.

DETAILED DESCRIPTION

Figure 1:
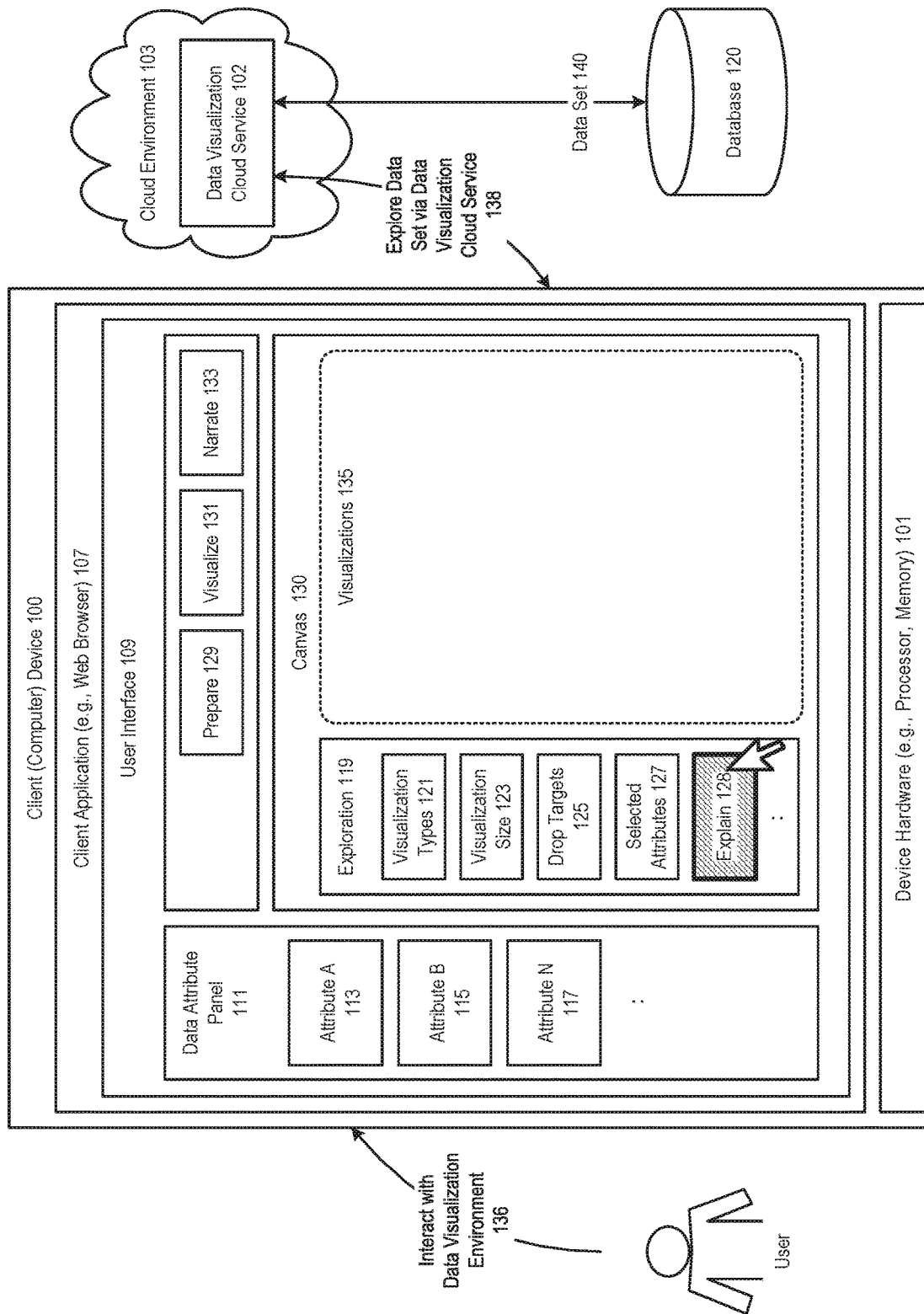
FIG. 1 illustrates a data visualization environment that uses machine learning, in accordance with an embodiment.

As described above, a data visualization environment can enable a user to create and display text, graphs, charts, or other types of visualizations that effectively present patterns, trends, or other meaningful information associated with the set of data, and which might otherwise be less discernable using traditional data reporting mechanisms, such as tables or spreadsheets.

However, developing visualizations for use with a large data set may require the skill of an experienced data scientist to determine which particular data attributes or types of visualizations best explains a particular target attribute, which can be time-consuming and require substantial effort for an ordinary business user.

In accordance with various embodiments, described herein are systems and methods for use of computer-implemented machine learning to automatically determine insights of facts, segments, outliers, or other information associated with a set of data, for use in generating visualizations of the data.

In accordance with an embodiment, the system can receive a data set that includes data points having data values and attributes, and a target attribute, and use a machine learning process to automatically determine one or more other attributes as driving factors for the target attribute, based on, for example, the use of a decision tree and a comparison of information gain, Gini, or other indices associated with attributes in the data set. Information describing facts associated with the data set can be graphically displayed at a user interface, as visualizations, and used as a starting point for further analysis of the data set.

In accordance with an embodiment, the system can use a machine learning process to automatically determine one or more segments within a data set, associated with a target attribute value, based on, for example, the use of a classification and regression tree and a combination of different driving factors, or same driving factors with different values. Information describing segments associated with the data set can be graphically displayed at a user interface, as text, graphs, charts, or other types of visualizations, and used as a starting point for further analysis of the data set.

In accordance with an embodiment, the system can use a machine learning process to automatically determine one or more outliers or findings within the data, based on, for example, determining a plurality of combinations representing pairs of attribute dimensions within a data set, from which a general explanation or pattern can be determined for one or more attributes, and then comparing particular values for attributes, with the determined pattern for those attributes. Information describing such outliers or findings can be graphically displayed at a user interface, as text, graphs, charts, or other types of visualizations, and used as a starting point for further analysis of the data set.

In accordance with an embodiment, the system can automatically determine, based on, for example, a user/business context and the characteristics of a data set, which machine learning algorithm(s) or parameter values to apply to the data set, in generating visualizations of the data.

For example, in accordance with an embodiment, a particular machine learning algorithm can be selected from a plurality of machine learning algorithms, or the same machine learning algorithm can be applied with different parameter values, and used to generate visualizations for the data set appropriate to the user/business context. The determination or selection of machine learning algorithm(s) or parameter values in rendering visualizations can be based on an examination of the data set itself, without specific input from a user.

In accordance with an embodiment, a technical purpose of the described embodiments includes the use of one or more computer systems or devices, which operate a machine learning process to automatically determine, based, for example, on a user/business context, computer-readable data that is associated with facts, segments, outliers, or other information associated with a data set, for use in creating and displaying visualizations of the data set, that can be used as a starting point for further analysis of the data set.

In accordance with an embodiment, the systems and methods described herein can be used in or with a data visualization cloud service (DVCS), an example of which is described below for purposes of illustration.

In accordance with other embodiments, the systems and methods described herein can be used in or with other types of computing environments, including other types of cloud computing environments, cloud environments, or on-premise (non-cloud) based computing environments.

Data Visualization Environment

In accordance with an embodiment, a data visualization environment can enable a user to create and display visualizations that effectively present patterns, trends, or other meaningful information associated with the set of data, which might otherwise be less discernable using traditional data reporting mechanisms, such as tables or spreadsheets.

For example, in accordance with an embodiment, a user can use the data visualization environment to experiment with a data set received from a database and representing rows and columns of data, by adding or removing columns, creating filters, applying different visualizations, and exploring the data set to find correlations, patterns, or trends.

In accordance with an embodiment, data can be uploaded to, or accessed via, the data visualization environment, from a variety of sources such as, for example, spreadsheets, comma-separated value (CSV) files, Oracle Fusion Applications, or relational database systems; and blended for processing, so that the blended data set can be analyzed as a whole, to reveal different patterns and information.

Once accessible within the data visualization environment, meaningful information associated with the set of data, such as patterns, trends, or other information, can be captured by creating insights, stories, and visualizations, which the user can subsequently revisit, or share with other users.

Machine Learning and Data Visualization

In accordance with various embodiments, described herein are systems and methods for use of computer-implemented machine learning to automatically determine insights of facts, segments, outliers, or other information associated with a set of data, for use in generating visualizations of the data.

Generally described, embodiments of a data visualization environment reduce the need for an experienced data scientist to determine which particular data attributes, or types of visualizations, best explains a particular target attribute of a set of data.

Instead, in accordance with an embodiment, the system can utilize a machine learning processor, and a user/business context, as a basis for processing a response to a question regarding the data set. For example, as might be encountered with a set of human resources data, such a user/business context might indicate a request to "explain attrition". Other types of requests and data sets can be associated with other types of user/business contexts. The system can then apply one or more machine learning algorithms to the data set, to provide answers, for example as facts, segments, or outliers regarding the data, with accompanying visualizations.

In accordance with an embodiment, answers to questions posed by users of the visualization environment can be provided by the system as text, graphs, charts, or other types of visualizations, in a canvas portion of a user interface, which the user can then further examine and manipulate as desired.

In accordance with an embodiment, the described approach enables the data visualization process to be accessed directly by business users, with less reliance on the need for data scientists. Additionally, since the system can evaluate data using machine learning processes, a model or understanding of the data can be dynamically created and examined as new data is received, without a prior training of the model, which enables rapid feedback to the user with respect to changes to the underlying data.

FIG. 1 illustrates a data visualization environment that uses machine learning, in accordance with an embodiment.

As illustrated in FIG. 1, in accordance with an embodiment, the data visualization environment can include or operate at a client computer system or device 100 having a physical device hardware (e.g., processor, memory) 101, that can be operated by a user to access a data visualization cloud service (DVCS) 102, at a cloud computing or cloud environment 103, to explore and determine insights associated with a data set.

Examples of the types of cloud computing or cloud environments that can be used, in accordance with an embodiment, include Oracle Analytics Cloud, wherein an example of a data visualization cloud service includes Oracle Analytics Cloud Service. In accordance with other embodiments, the features described herein can be provided in with other types of computing environments, including other types of cloud computing environments, cloud environments, cloud services, or on-premise (non-cloud) based computing environments.

In accordance with an embodiment, the user interface can be displayed by a client application 107, that can be implemented as software or computer-readable program code that is executable by a computer system or other processing device, having a user interface 109, such as, for example, a software application or a web browser, wherein the client application can retrieve or access data via, e.g., a HTTP or other network connection to the data visualization cloud service.

In accordance with an embodiment, the user interface can include a data attribute panel 111, that enables a user to display a data set, and to drag and drop attributes 113, 115, 117 from the data attribute panel to a canvas 130 in the user interface, to create visualizations 135, e.g., text, graphs, charts, or other types of visualizations.

In accordance with an embodiment, the data attribute panel can display data elements associated with a data source, such as a database 120, including rows, columns, attributes, measures, or dimensions.

In accordance with an embodiment, the user interface can include an exploration 119 portion, and also a plurality of configuration options, for example, a visualization types 121 option, for changing text, graphs, charts, or other types of visualizations, and a visualization size 123 option, for resizing visualizations being developed. These configuration options can be used to change layouts and visualizations within the user interface, to present new insights, and assist users in answering questions quickly.

In accordance with an embodiment, the exploration portion can further include a plurality of drop target attributes 125 options, to enable data elements (e.g., measures and attributes) to be added to a visualization being developed. For example, a dropped target attribute can be a visualization element (e.g., a data attribute or column) onto which a compatible data element can be dropped from the data attribute panel. Data elements that are selected and used in a visualization being developed can be displayed in a selected attributes 127 portion.

In accordance with an embodiment, a user can, for example, use the data visualization environment to create a project, and then add data into the data visualization environment by connecting an application data source. Once the data is prepared in accordance with requirements of the data visualization cloud service, the user can drag and drop data elements from the data attribute panel, to generate text, graphs, charts, or other types of visualizations, from which patterns and attributes of interest can be identified by varying visualization types, including, for example, resizing a particular visualization, selecting a particular segment in a visualization using one or more filters, or comparing multiple visualizations.

In accordance with an embodiment, the exploration portion can include an explain 128 option, that provides access to a machine learning-based analysis of a data set, for example to determine insights of facts, segments, outliers, or other information associated with a set of data, examples of which are described in further detail below.

In accordance with an embodiment, the client application can provide support for data preparation, visualization, and story capturing, using prepare 129, visualize 131, and narrate 133 options respectively.

For example, in accordance with an embodiment, the system enables a user to interact with the data visualization environment 136, to explore a data set using a data visualization cloud service 138, wherein access to the data set 140 is provided via the data visualization cloud service.

Figure 2:
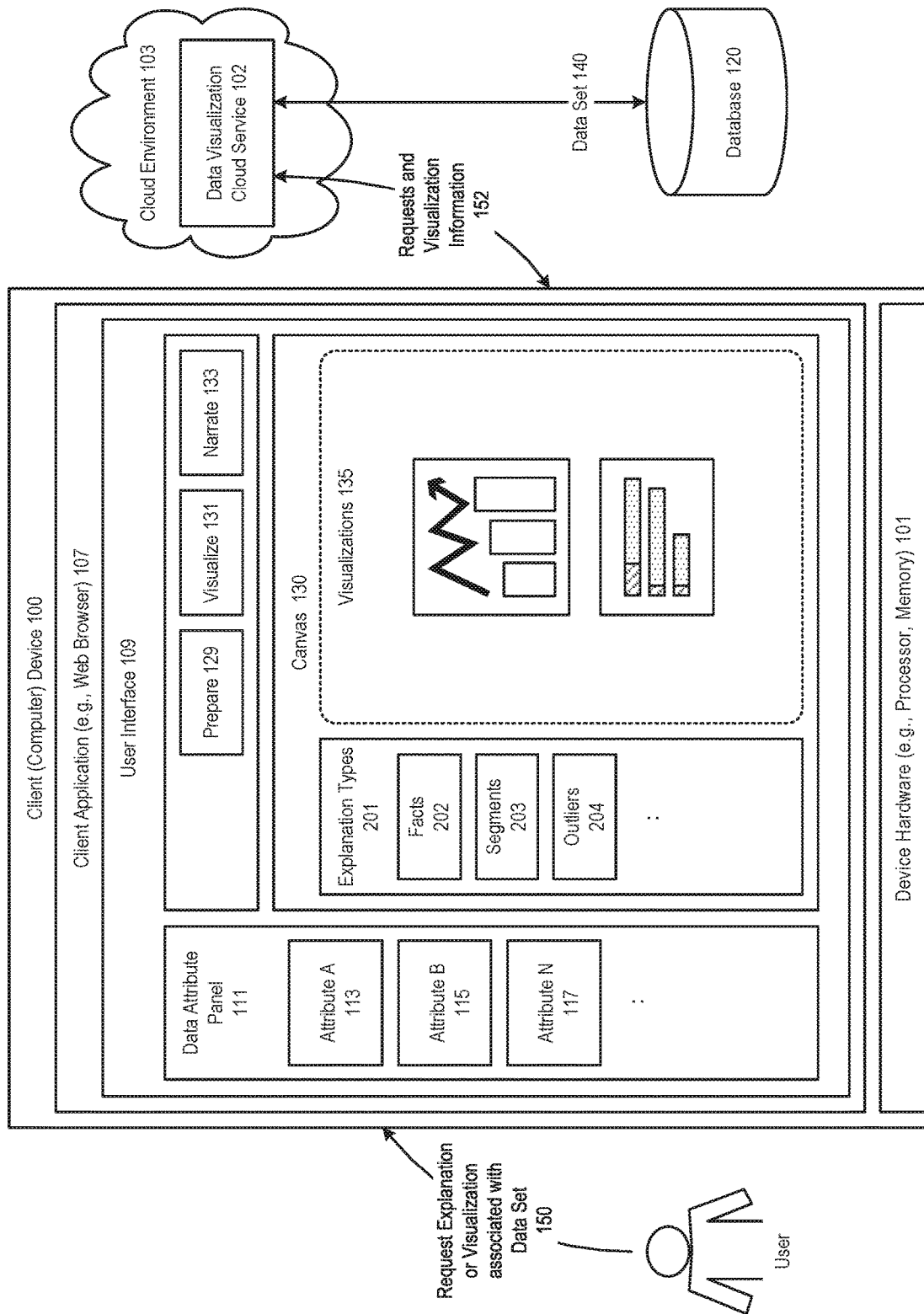
FIG. 2 further illustrates a data visualization environment that uses machine learning, in accordance with an embodiment.

FIG. 2 further illustrates a data visualization environment that uses machine learning, in accordance with an embodiment.

As illustrated in FIG. 2, in accordance with an embodiment, selection of the explain option causes the system to display a plurality of explanation types 201, such as, for example, facts 202, segments 203, or outliers 204, each of which can be associated with a machine learning machine learning algorithm, as described in further detail below. A user can request an explanation or visualization associated with a data set 150, for example, facts, segments, or outliers associated with that data set; and the requests and visualization information 152 can then be communicated between the client application and the data visualization cloud service.

Figure 3:
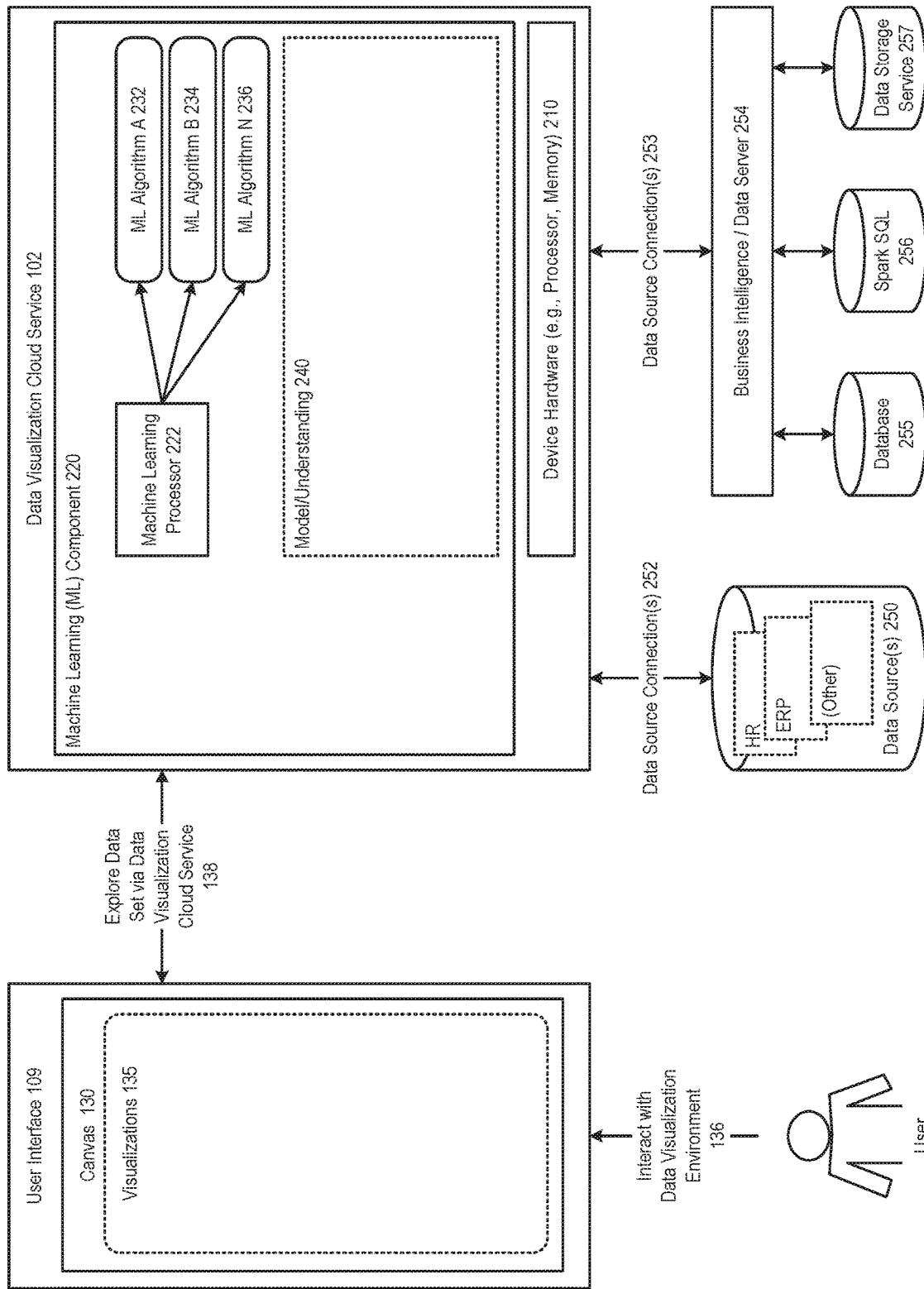
FIG. 3 further illustrates a data visualization environment that uses machine learning, in accordance with an embodiment.

FIG. 3 further illustrates a data visualization environment that uses machine learning, in accordance with an embodiment.

As illustrated in FIG. 3, in accordance with an embodiment, the data visualization cloud service can include or operate at a computer system or device having a physical device hardware (e.g., processor, memory) 210, and a machine learning component 220, including a machine learning processor 222, and a plurality of machine learning algorithms 232, 234, 236 that can be selectively used by the data visualization cloud service to prepare a model or understanding 240 of a particular set of data.

Upon request from the client applications, for example, through the use of the explain option described above, information describing facts, segments, outliers, or other information associated with the data set, can be provided by the data visualization cloud service, and graphically displayed at a user interface, as a visualization, where it can be used as a starting point for further analysis of the data set.

In accordance with an embodiment, the data set processed by the data visualization cloud service can be retrieved or prepared from any number of data source(s) 250, via one or more data source connections(s) 252, 253. Examples of the types of data that can be examined and visualized include human resources (HR) data, enterprise resource planning (ERP) data, or other, e.g., business or enterprise data.

For example, in accordance with an embodiment, prepared data can be retrieved via a business intelligence server 254 in communication with one or more of a database 255, Spark SQL storage 256, data storage service 257, or other type of data repository or data source.

In accordance with an embodiment, calculations performed by the data visualization cloud service in applying selected machine learning algorithms to particular sets of data can be pushed down, via the business intelligence server, to one or more computation engines in one or more of the plurality of data source(s), for example, a database, Spark SQL, or data storage service.

To accommodate communication with data source(s), in accordance with an embodiment, each of the backend data source(s) can include an adapter to communicate with the data visualization cloud service via the business intelligence server.

In accordance with an embodiment, the machine learning component provided at the data visualization cloud service, including the machine learning processor, machine learning algorithms, and additional features described above, can be implemented as software or computer-readable program code that is executable by a computer system or other processing device, including, for example, a cloud computing or cloud environment.

Figure 4:
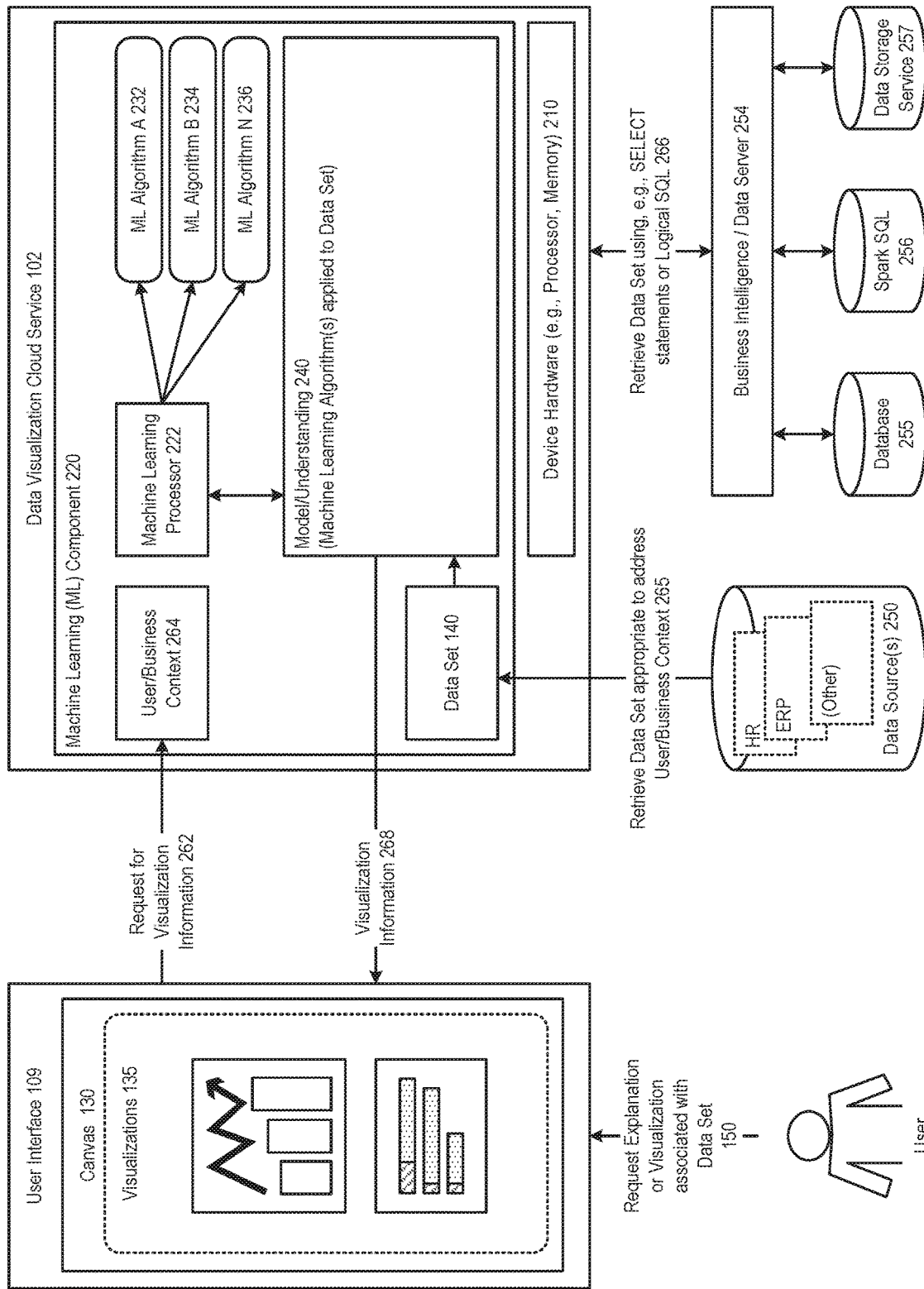
FIG. 4 further illustrates a data visualization environment that uses machine learning, in accordance with an embodiment.

FIG. 4 further illustrates a data visualization environment that uses machine learning, in accordance with an embodiment.

As illustrated in FIG. 4, in accordance with an embodiment, upon receiving a request for explanation or visualization, for example through the use of the explain option described above, the request 262 is communicated to the data visualization cloud service, which creates a user/business context 264 associated with the request, retrieves the retrieve data set appropriate to address the user/business context 65.

For example, in accordance with an embodiment, the data visualization cloud service can, where appropriate, retrieve a data set using, e.g., SELECT statements or Logical SQL 266

In accordance with an embodiment, system can then create a model or understanding of the data set by applying appropriate machine learning algorithms, and returns the visualization information 268 to the client.

For example, in accordance with an embodiment, when the data visualization cloud service receives a request for explanations for an attribute A within a data set, the system can be used apply a machine learning algorithm to determine driving factors for attribute A within the received data set, as described in further detail below.

Figure 5:
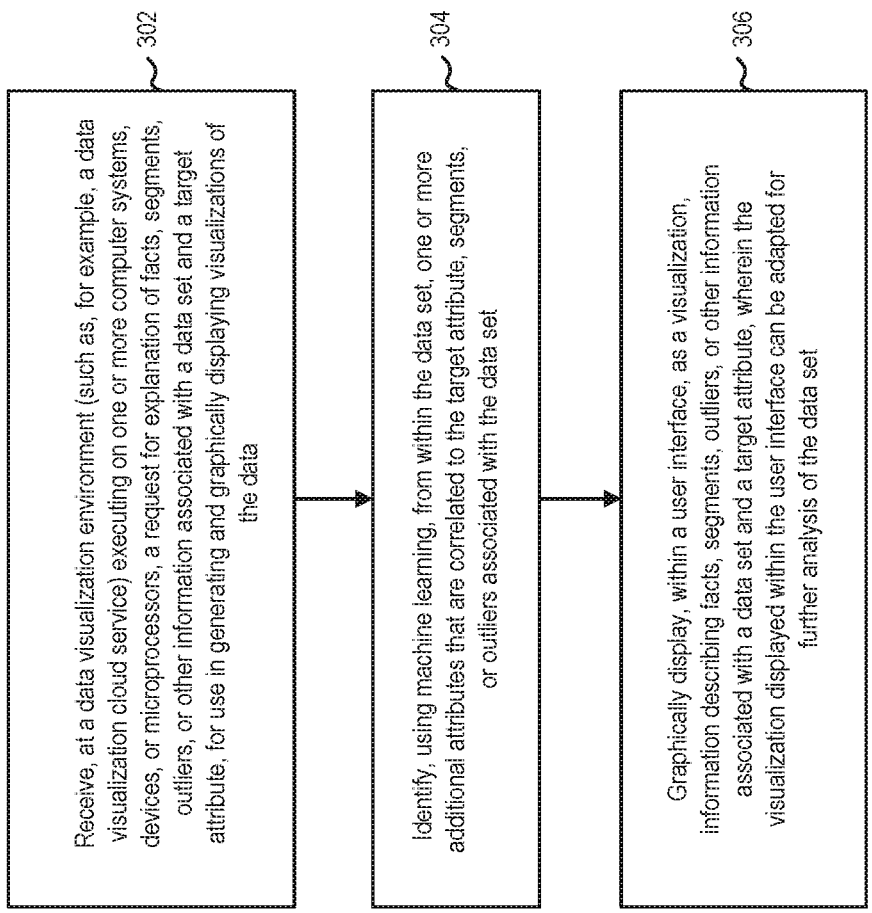
FIG. 5 illustrates a method of providing a data visualization environment that uses machine learning, in accordance with an embodiment.

FIG. 5 illustrates a method of providing a data visualization environment that uses machine learning, in accordance with an embodiment.

As illustrated in FIG. 5, in accordance with an embodiment, at step 302, the system receives, at a data visualization environment (such as, for example, a data visualization cloud service) executing on one or more computer systems, devices, or microprocessors, a request for explanation of facts, segments, outliers, or other information associated with a data set and a target attribute, for use in generating and graphically displaying visualizations of the data.

At step 304, the system identifies, using a machine learning process, from within the data set, one or more additional attributes that are correlated to the target attribute, segments, or outliers associated with the data set.

At step 306, the system graphically displays, within a user interface, as a visualization, information describing facts, segments, outliers, or other information associated with a data set and a target attribute, wherein the visualization displayed within the user interface can be adapted for further analysis of the data set.

Automatic Insight of Facts

In accordance with an embodiment, the system can receive a data set that includes data points having data values and attributes, and a target attribute, and use a machine learning process to automatically determine one or more other attributes as driving factors for the target attribute, based on, for example, the use of a decision tree and a comparison of information gain, Gini, or other indices associated with attributes in the data set. Information describing facts associated with the data set can be graphically displayed at a user interface, as visualizations, and used as a starting point for further analysis of the data set.

Generally described, in accordance with an embodiment, the system enables a user to select an attribute of interest, which is associated with a set of data, for which the system can then automatically determine, based on the user/business context, and its model or understanding of the data, one or more other data elements or attributes that are most relevant to the target attribute and are considered driving factors for that attribute.

The factual information can then be expressed as facts regarding the data, with accompanying visualizations of the driving factors.

Figure 6:
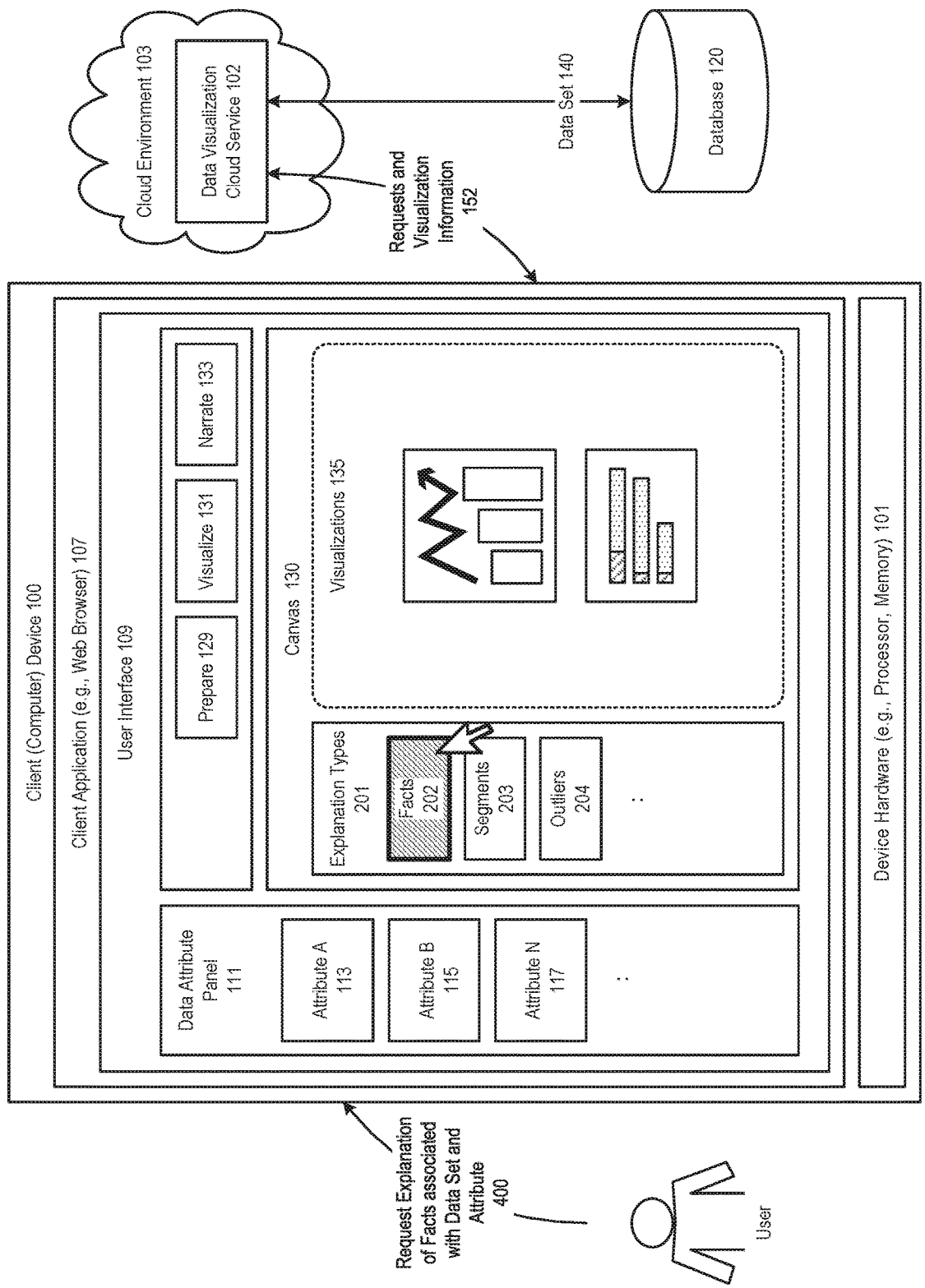
FIG. 6 illustrates a data visualization environment that uses machine learning to enable generation and graphical display of visualizations or other information associated with a set of data, including automatic insight of facts, in accordance with an embodiment.

FIG. 6 illustrates a data visualization environment that uses machine learning to enable generation and graphical display of visualizations or other information associated with a set of data, including automatic insight of facts, in accordance with an embodiment.

As illustrated in FIG. 6, for example, a user can request an explanation of facts associated with a data set and attribute 400.

In accordance with an embodiment, in response to receiving the request directed to a target attribute, the system can generate a decision tree, and set apply a machine learning algorithm to perform a comparison of information gain, Gini, or other indices among the attributes in the data set, to identify one or more attributes as driving factors for explaining the target attribute. Those attributes identified as driving factors are the attributes that are most strongly correlated to the target attribute, as determined by the comparison of information gain, Gini, or other indices.

For example, in accordance with an embodiment, as might be encountered with a set of human resources data, the system can identify attributes such as "overtime" and "job level" as driving factors for the target attribute "job attrition", as these two attributes can best explain the attribute "job attrition" in the data set.

In accordance with an embodiment, the system can cause the graphical user interface to display, for each of the identified attributes or driving factors, a detailed breakdown of observations (e.g., row counts) of the target attribute corresponding to different values or value ranges of each identified attribute. The display of such information enables a user to visually identify a particular value range of an identified attribute for further investigation.

In accordance with an embodiment, the comparison of information gain, Gini, or other indices can be based on an evaluation of entropy between the attributes of the data set.

For example, in accordance with an embodiment, a conditional entropy H of X and Y is a measure of the uncertainty of attribute X, given knowledge of attribute Y; and is a non-negative real number that becomes zero when X=Y, or when there exists a functional dependency from Y to X, since in these cases, no uncertainty exists for attribute X. On the other hand, if the two attributes X and Y are independent, the conditional entropy H (X|Y) equals H (X).

In accordance with an embodiment, the comparison of information gain, Gini, or other indices measures the reduction in uncertainty of one attribute, due to the knowledge of the other attribute, e.g., the amount of information that one attribute contains about the other. Such amount is zero when two attributes are independent, and increases as the dependency between the two attributes grows. For example, the information gain ratio of an attribute with itself is a value of 1.

Figure 7:
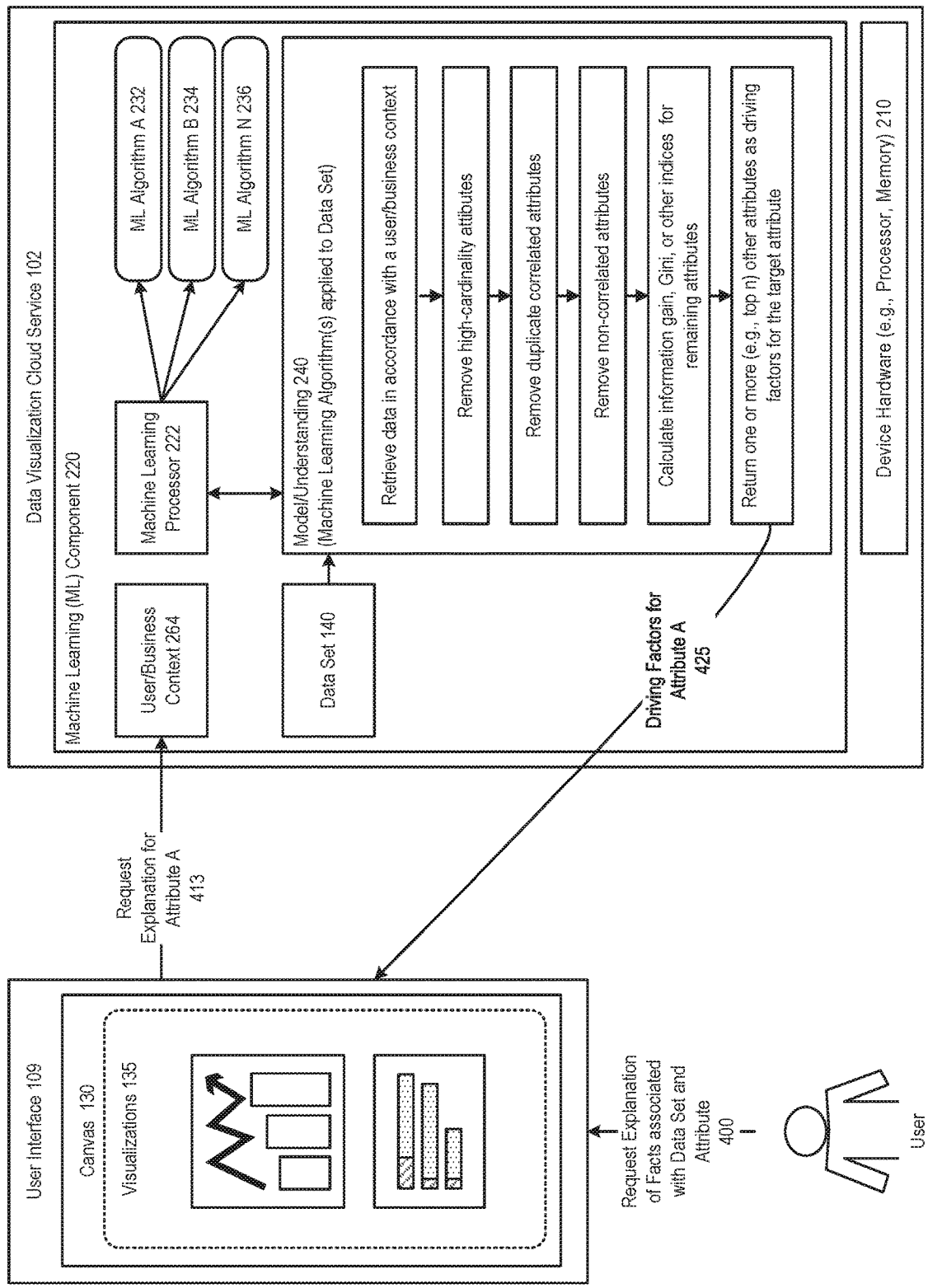
FIG. 7 further illustrates a data visualization environment that uses machine learning to enable graphical display of information associated with a set of data, including automatic insight of facts, in accordance with an embodiment.

FIG. 7 further illustrates a data visualization environment that uses machine learning to enable graphical display of information associated with a set of data, including automatic insight of facts, in accordance with an embodiment.

As illustrated in FIG. 7, in accordance with an embodiment, the request for explanation of an attribute (e.g., attribute A) 413 can be communicated to the data visualization cloud service, which applies a machine learning algorithm to determine a response.

In accordance with an embodiment, the prepared data received at the data visualization cloud service can be pruned, by removing one or more high-cardinality attributes. As referred to herein, high-cardinality attributes generally refer to columns with values that are very uncommon or unique. For example, high-cardinality column values may include attributes such as identification numbers, email addresses, or user names.

In accordance with an embodiment, duplicates of correlated columns can be removed. For example, monthly income and monthly rate are so closely related that only one of these attribute is needed; and either the monthly income or monthly rate can be removed from the data set.

In accordance with an embodiment, an information gain, Gini, or other index is calculated for each column.

In accordance with an embodiment, one or more attributes can be identified as driving factors for the target attribute, based on the comparison of information gain, Gini, or other indices. For example, in accordance with an embodiment, the attributes can be sorted so that those attributes having the largest information gain, Gini, or other indices from the target attribute, can be identified as the driving factors for that (target attribute) attribute.

In accordance with an embodiment, one or more driving factors for the target attribute, for example attribute A 425, can then be returned to the client, where they can be graphically displayed at a user interface, as text, graphs, charts, or other types of visualizations, and used as a starting point for further analysis of the data set.

Figure 8:
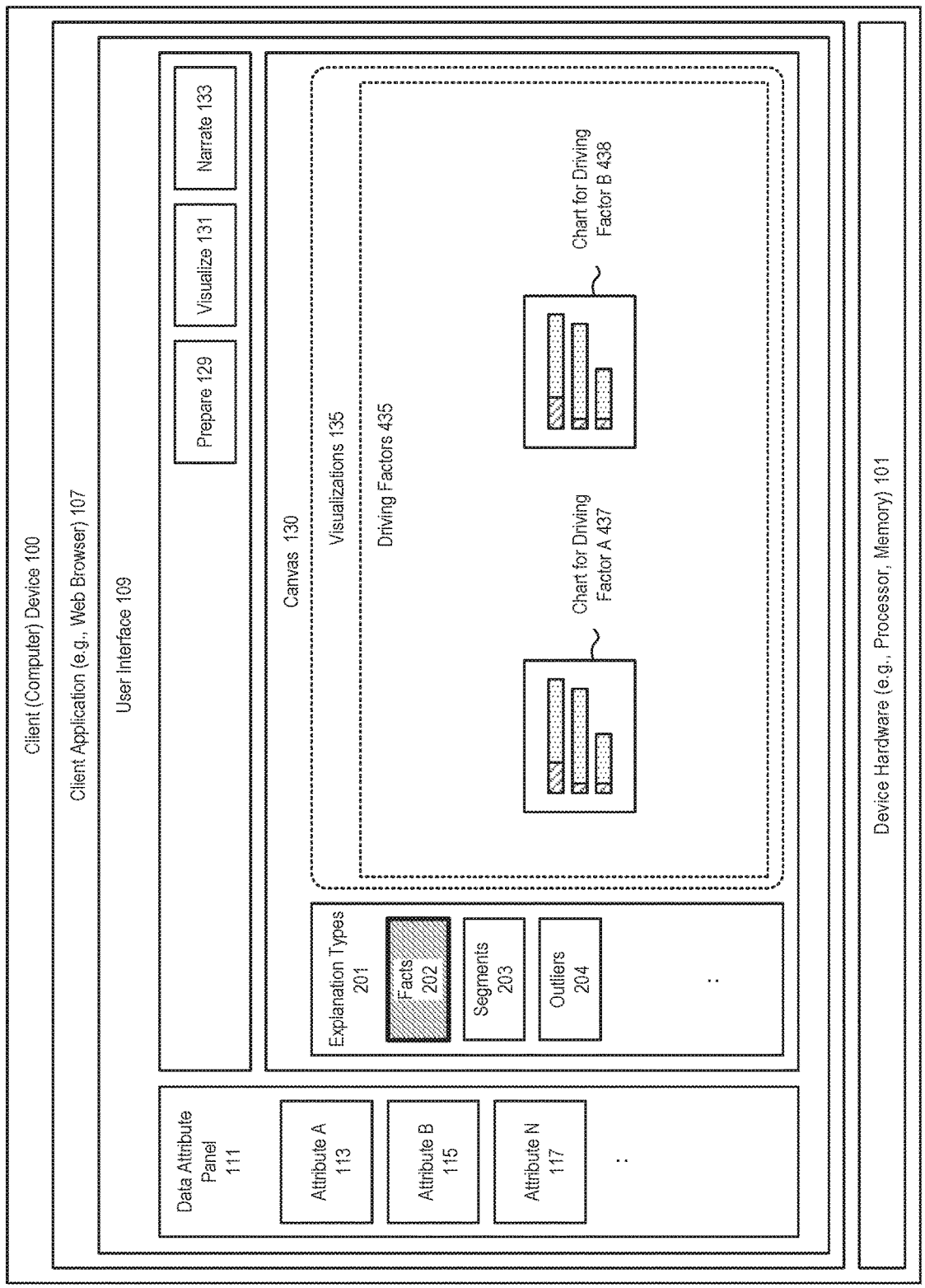
FIG. 8 further illustrates a data visualization environment that uses machine learning to enable graphical display of information associated with a set of data, including automatic insight of facts, in accordance with an embodiment.

FIG. 8 further illustrates a data visualization environment that uses machine learning to enable graphical display of information associated with a set of data, including automatic insight of facts, in accordance with an embodiment.

As described above, in accordance with an embodiment, instead of the user trying different combinations of attributes in a data set to identity driving factors associated with a target attribute, the system can automatically generate and graphically display one or more driving factors 435 in the user interface, in response to the user requesting explanations associated with a particular attribute, for example, attribute A.

As illustrated in FIG. 8, in accordance with an embodiment, a plurality of driving factors associated with the target attribute, for example, driving factor A and driving factor B, can be automatically identified to explain the target attribute (e.g., attribute A). Each driving factor can represent an attribute from the data attribute panel, and can be graphically displayed at a user interface, as text, graphs, charts, or other types of visualizations, and used as a starting point for further analysis of the data set.

For example, the visualizations for driving factor A (437) and driving factor B (438) can graphically display observations of the target attribute corresponding to different values or value ranges for each of a plurality of measures of the target attribute.

Figure 9:
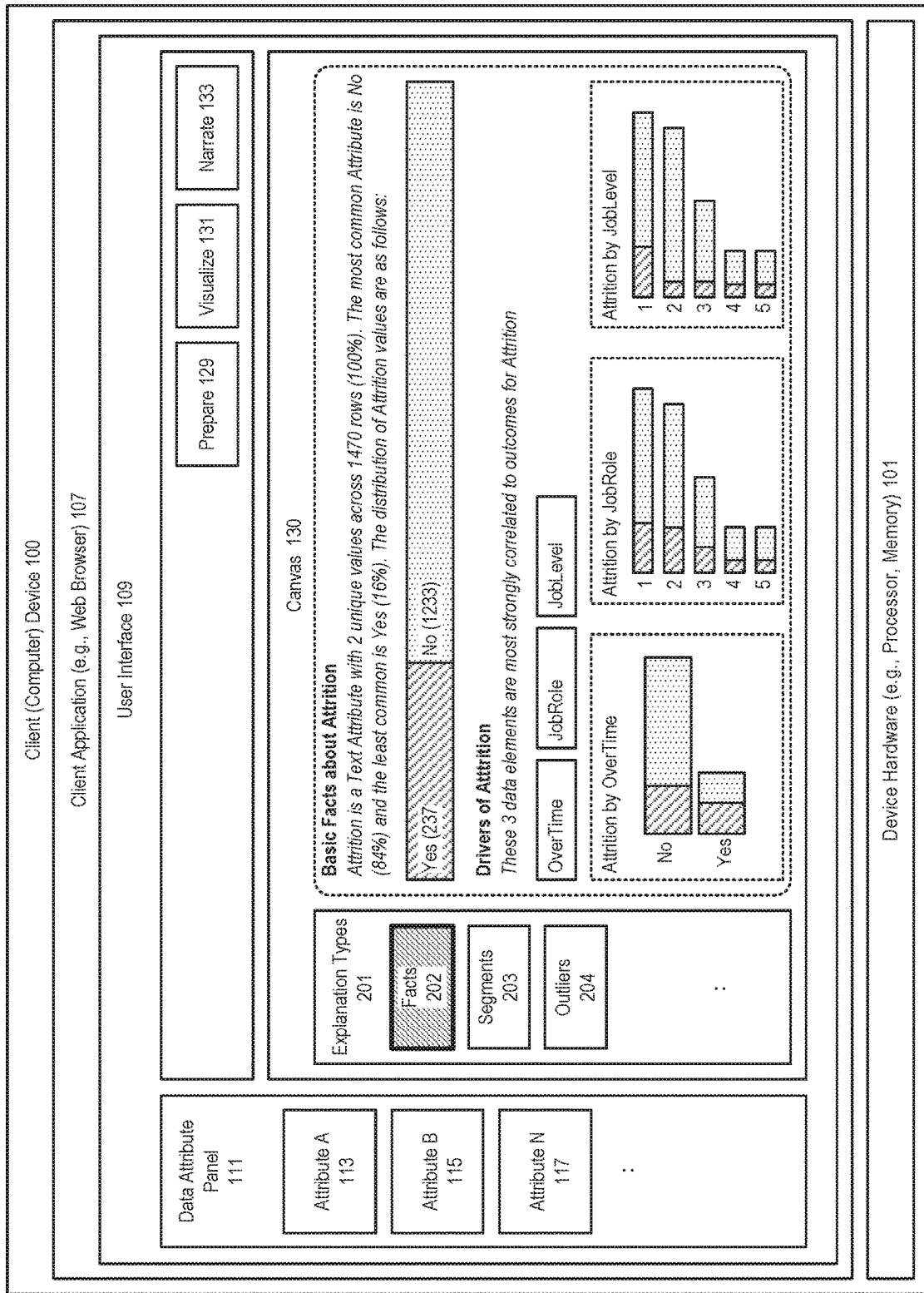
FIG. 9 illustrates an example of how the data visualization environment graphically displays visualizations or other information associated with a set of data, including automatic insight of facts, in accordance with an embodiment.

FIG. 9 illustrates an example of how the data visualization environment graphically displays visualizations or other information associated with a set of data, including automatic insight of facts, in accordance with an embodiment.

As illustrated in FIG. 9, in accordance with an embodiment, each identified attribute considered to be a driving factor can be represented by a text, graphs, charts, or other types of visualizations that graphically displays observations of the target attribute corresponding to different values or value ranges for each identified attribute.

For example, as might be encountered with a set of human resources data, the attributes "overtime", "job role", and "job level" may be determined as driving factors for "attrition", as identified by the data visualization cloud service. In this example, for the driving factor "job level", the associated visualization illustrates that observations of outcomes for the value for the attribute "job attrition" increases as the value for the attribute "job level" decreases, and that there is a largest observations of outcomes for the "job attrition" at "job level 1".

Figure 10:
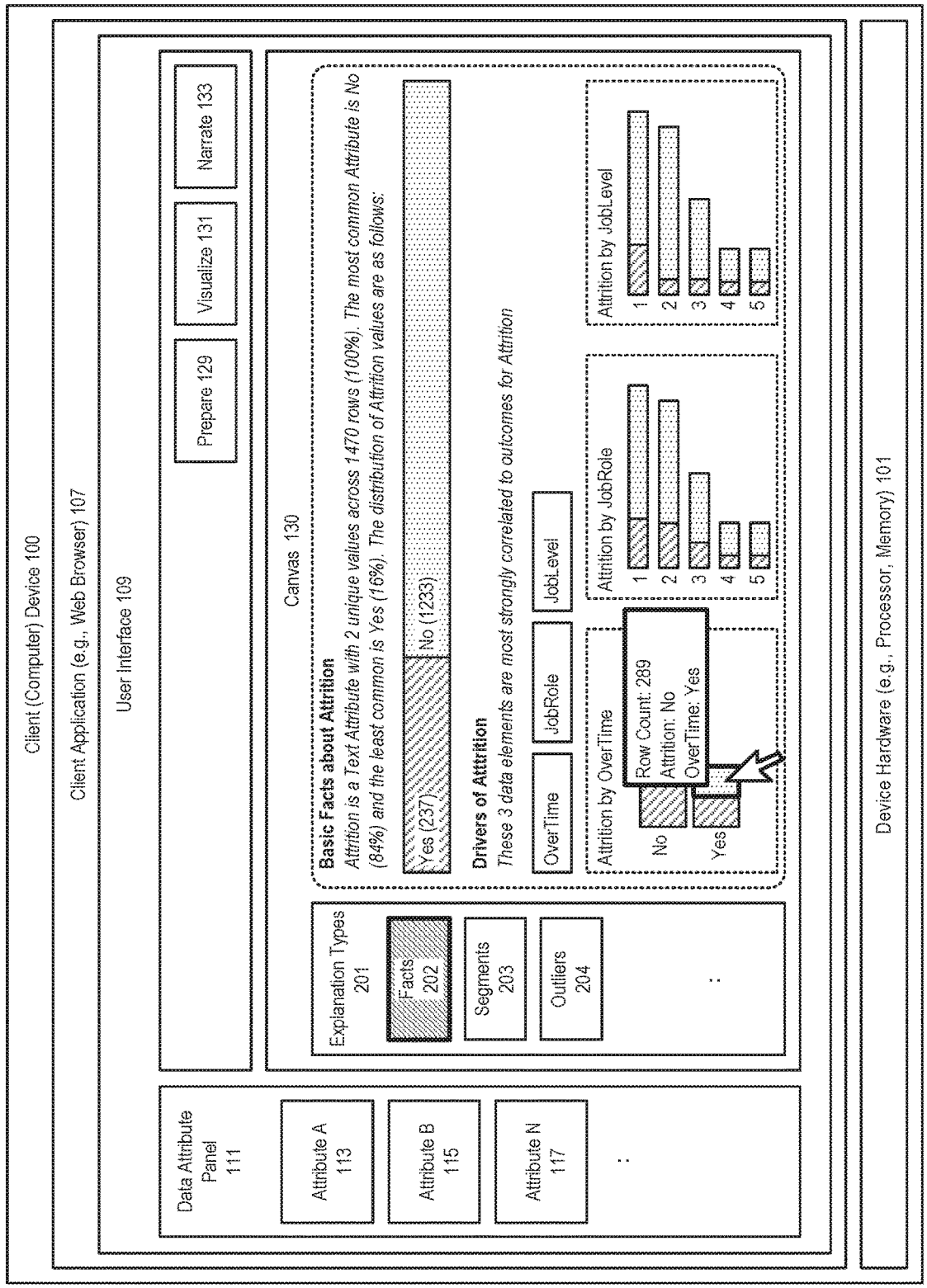
FIG. 10 further illustrates an example of how the data visualization environment graphically displays visualizations or other information associated with a set of data, including automatic insight of facts, in accordance with an embodiment.

FIG. 10 further illustrates an example of how the data visualization environment graphically displays visualizations or other information associated with a set of data, including automatic insight of facts, in accordance with an embodiment.

As illustrated in FIG. 10, in accordance with an embodiment, the user can click on the visual for "job level 1" for further investigation. As illustrated in this example, "overtime", "job role", and "job level" are the driving factors identified by the data visualization cloud service. For each driving factor, the system can display data to describe in detail the breakdown of observations (e.g., row counts) of attrition. For example, with the driving factor "overtime", the system can graphically display that a larger percentage of observations or rows are for no attrition when there is "no overtime", compared with when there is "overtime". The related visual for the driving factor shows that "overtime" is correlated to attrition.

Figure 11:
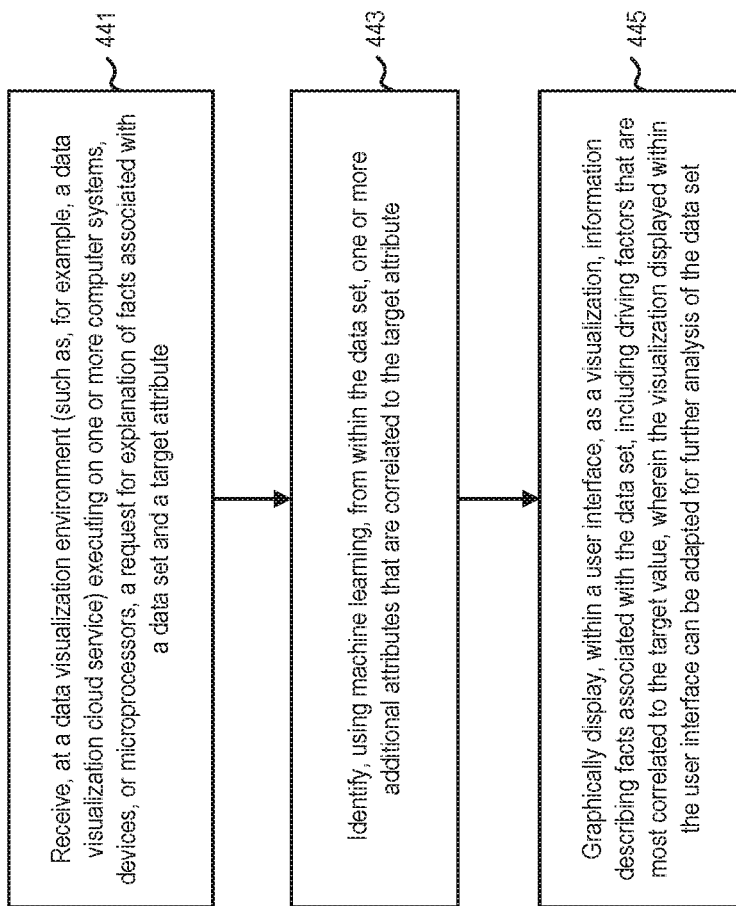
FIG. 11 illustrates a method by which a data visualization environment uses machine learning to enable graphical display of information associated with a set of data, including automatic insight of facts, in accordance with an embodiment.

FIG. 11 illustrates a method by which a data visualization environment uses machine learning to enable graphical display of information associated with a set of data, including automatic insight of facts, in accordance with an embodiment.

As illustrated in FIG. 11, in accordance with an embodiment, at step 441, the system receives, at a data visualization environment (such as, for example, a data visualization cloud service) executing on one or more computer systems, devices, or microprocessors, a request for explanation of facts associated with a data set and a target attribute.

At step 443, the system identifies, using a machine learning process, from within the data set, one or more additional attributes that are correlated to the target attribute.

At step 445, the system graphically displays, within a user interface, as a visualization, information describing facts associated with the data set, including driving factors that are most correlated to the target attribute value, wherein the visualization displayed within the user interface can be adapted for further analysis of the data set.

Figure 12:
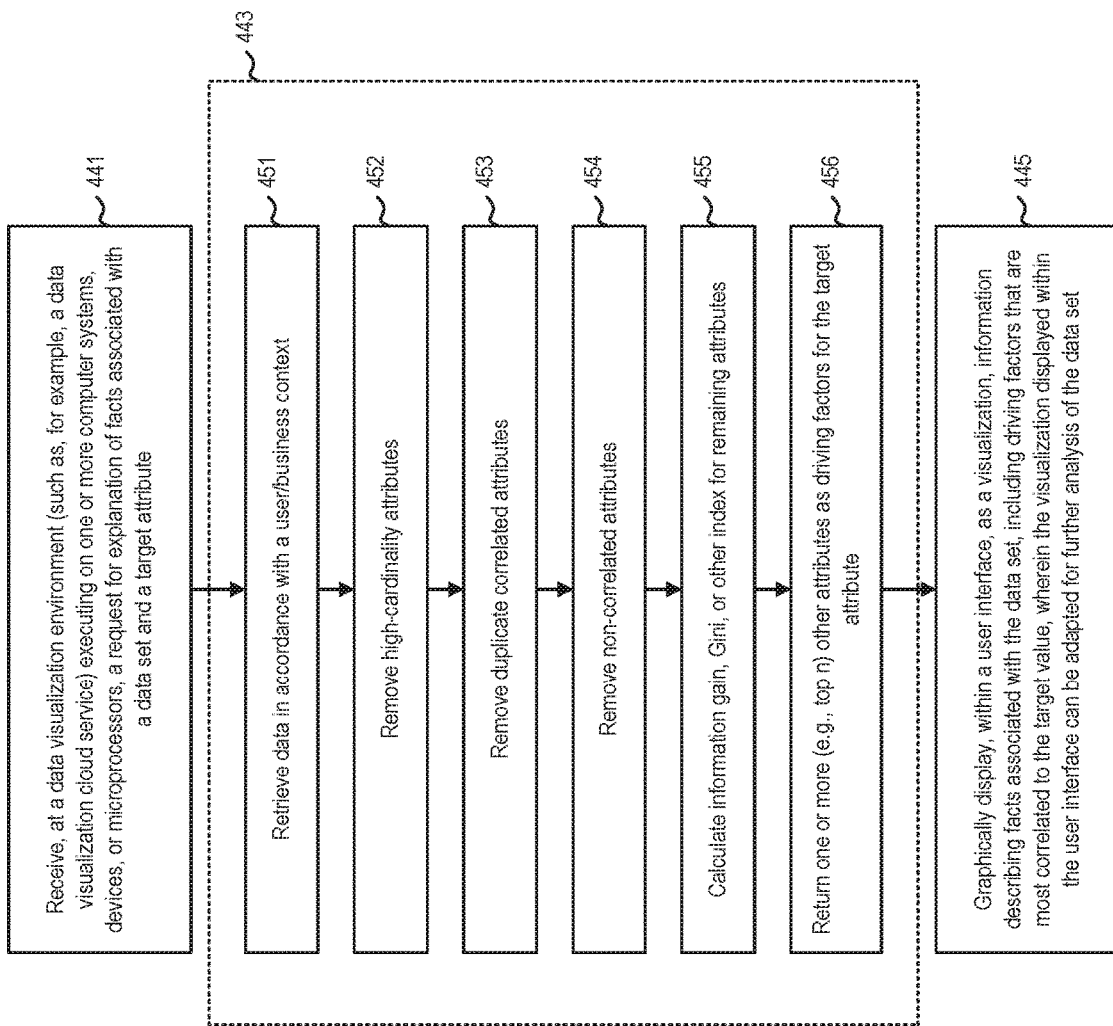
FIG. 12 further illustrates a method by which a data visualization environment uses machine learning to enable graphical display of information associated with a set of data, including automatic insight of facts, in accordance with an embodiment.

FIG. 12 further illustrates a method by which a data visualization environment uses machine learning to enable graphical display of information associated with a set of data, including automatic insight of facts, in accordance with an embodiment.

As illustrated in FIG. 12, in accordance with an embodiment, at step 451, data is retrieved into the system in accordance with a user/business context.

At step 452, high-cardinality attributes are removed. For example, as described above, high-cardinality attributes generally refer to columns with values that are very uncommon or unique, for example, identification numbers, email addresses, or user names.

At step 453, duplicate correlated attributes are removed.

At step 454, non-correlated attributes are removed.

At step 455, an information gain, Gini, or other index is calculated for remaining attributes.

At step 456, one or more (e.g., top n) other attributes are returned as driving factors for the target attribute.

Automatic Insight of Segments

In accordance with an embodiment, the system can use a machine learning process to automatically determine one or more segments within a data set, associated with a target attribute value, based on, for example, the use of a classification and regression tree and a combination of different driving factors, or same driving factors with different values. Information describing segments associated with the data set can be graphically displayed at a user interface, as text, graphs, charts, or other types of visualizations, and used as a starting point for further analysis of the data set.

Although information such as driving factors associated with given target attribute, as described above, provide useful starting points for further investigation; the driving factors themselves may not inform users as to how and why the driving factors are useful.

Generally described, in accordance with an embodiment, the system enables a user to select an attribute of interest, wherein the system can then automatically determine, based on the user/business context, and its model or understanding of the data, one or more segments of data that the system determines are most useful with regard to the target attribute.

The segment information can then be expressed as text, graphs, charts, or other types of visualizations regarding the segments of data.

In accordance with an embodiment, each segment can represent potentially driving or interesting data segments associated with given target attribute value. For example, a segment can be a combination of driving factors, or the same set of driving factors with different values. The visualization of the segments can enable users to, for example, identify those largest segments for the users to conduct further investigation.

Figure 13:
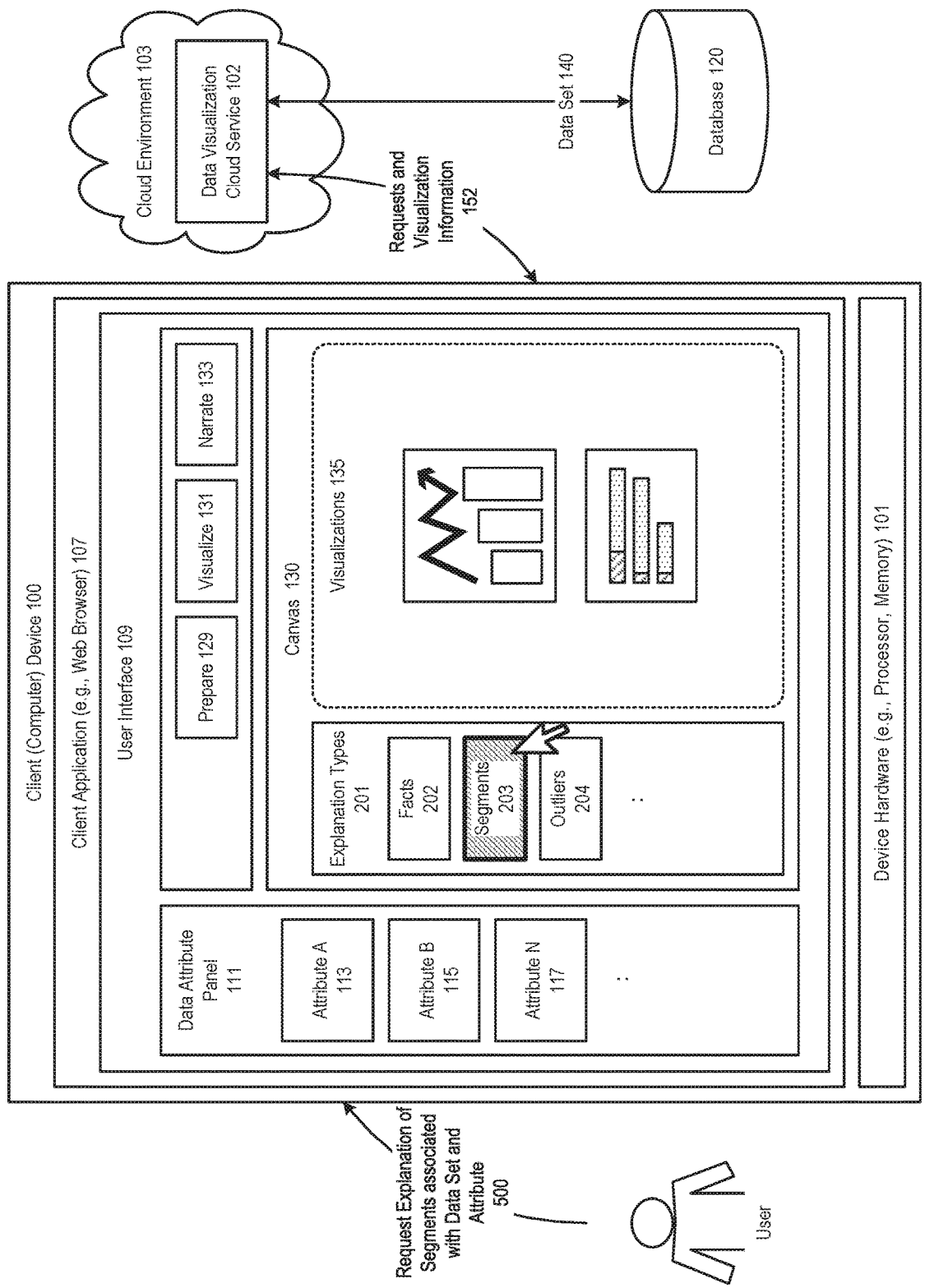
FIG. 13 illustrates a data visualization environment that uses machine learning to enable generation and graphical display of visualizations or other information associated with a set of data, including automatic insight of segments, in accordance with an embodiment.

FIG. 13 illustrates a data visualization environment that uses machine learning to enable generation and graphical display of visualizations or other information associated with a set of data, including automatic insight of segments, in accordance with an embodiment.

As illustrated in FIG. 13, in accordance with an embodiment, a user can request an explanation of segments associated with a data set and attribute 500.

Figure 14:
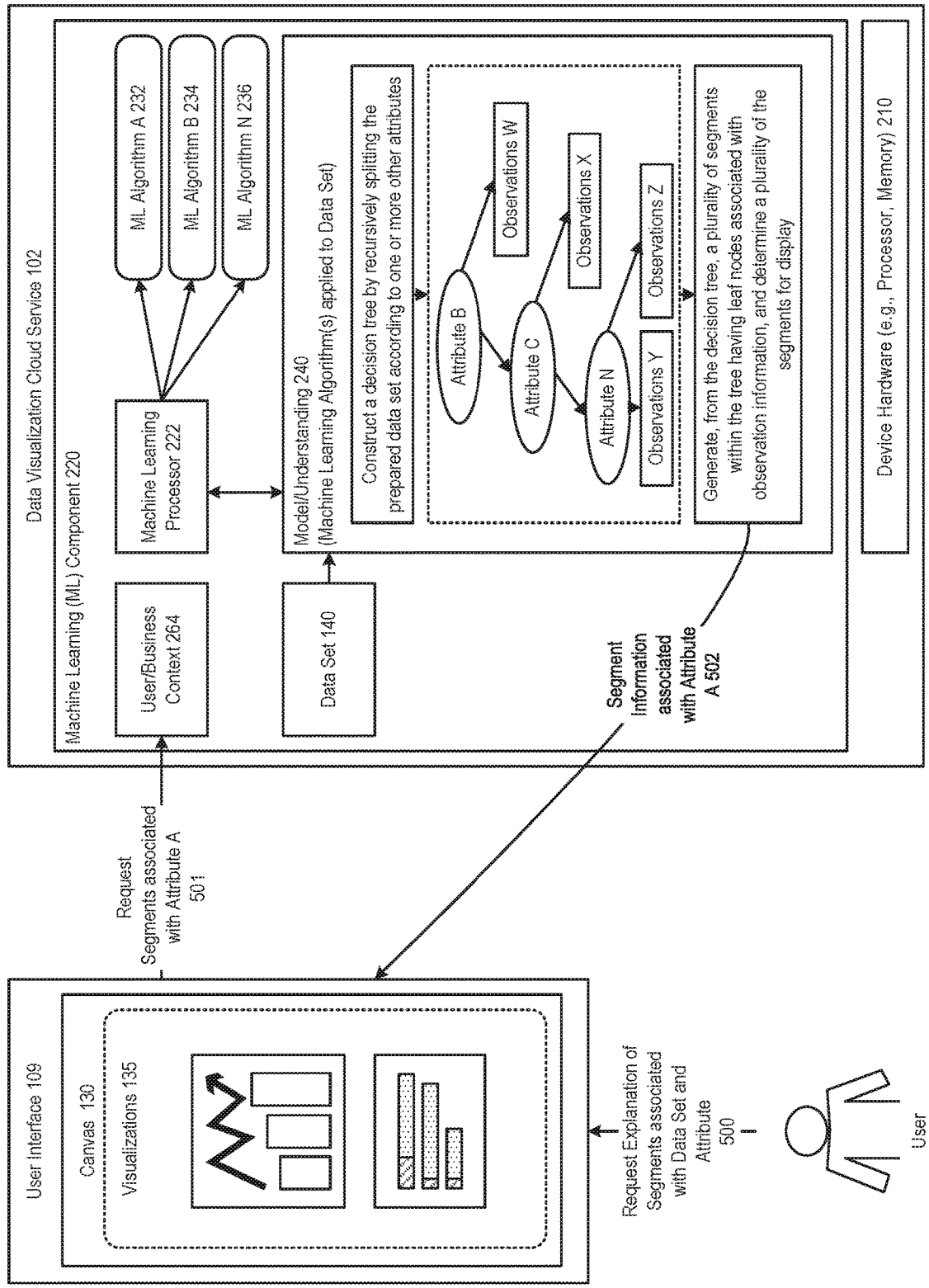
FIG. 14 further illustrates a data visualization environment that uses machine learning to enable graphical display of information associated with a set of data, including automatic insight of segments, in accordance with an embodiment.

FIG. 14 further illustrates a data visualization environment that uses machine learning to enable graphical display of information associated with a set of data, including automatic insight of segments, in accordance with an embodiment.

As illustrated in FIG. 14, in accordance with an embodiment, the request for segments associated with an attribute 501 (e.g., attribute A) can be communicated to the data visualization cloud service, which applies a machine learning algorithm to determine a response, such as segment information associated with the attribute A 502.

For example, in accordance with an embodiment, prepared data can be loaded into the data visualization cloud service as a user-selected data, when the system receives a user request for segments to explain a target attribute "attrition".

In accordance with an embodiment, the system can utilize a classification and regression tree (CART) machine learning algorithm to classify a given data set into different segments.

In accordance with an embodiment, the prepared data received at the data visualization cloud service can be pruned, by removing one or more high-cardinality attributes. As referred to herein, high-cardinality attributes generally refer to columns with values that are very uncommon or unique. For example, high-cardinality column values may include attributes such as identification numbers, email addresses, or user names.

In accordance with an embodiment, duplicates of correlated columns can be removed. For example, monthly income and monthly rate are so closely related that only one of these attribute is needed; and either the monthly income or monthly rate can be removed from the data set.

Next, in accordance with an embodiment, the data visualization cloud service can feed the pruned data to a software component that implements a classification and regression tree machine learning algorithm, which uses a decision tree.

In accordance with an embodiment, the decision tree represents a sequence of questions or decisions to be made by the system, the outcome or answers to which determine what the next question, if any, should be. The result of these questions is a tree-like structure that includes terminal nodes at which point there are no more questions.

In accordance with an embodiment, the machine learning algorithm, when applied by the system, can include: processing rules for splitting data at a node based on the value of one variable; stopping rules for deciding when a branch is terminal and cannot be split any further; and a determination of a prediction for the target attribute variable in each terminal node.

In accordance with an embodiment, the data visualization cloud service starts to construct a decision tree using the prepared data set as described above, by splitting the prepared data set using attribute B and a rule.

For example, as might be encountered with a set of human resources data, the system can split a data set into two groups, those without "overtime" in one group, and those with "overtime" in another group. Similarly, the system may continue to split the observations or rows at that stage, until the system determines no splitting should be continued, based on a defined rule.

In accordance with an embodiment, when the system determines that no more splitting is to be performed, a plurality of leaf nodes can be generated or otherwise determined, wherein each of the leaf nodes is associated with a number of observations or rows. The leaf nodes and associated information can then be used to generate the automatic insight of segments for display in the user interface.

For example, in accordance with an embodiment, when the user requests an explanation for attribute A using segments by clicking on the segments type in the explanation types, the data visualization cloud service can generate multiple segments and display the in the user interface.

Figure 15:
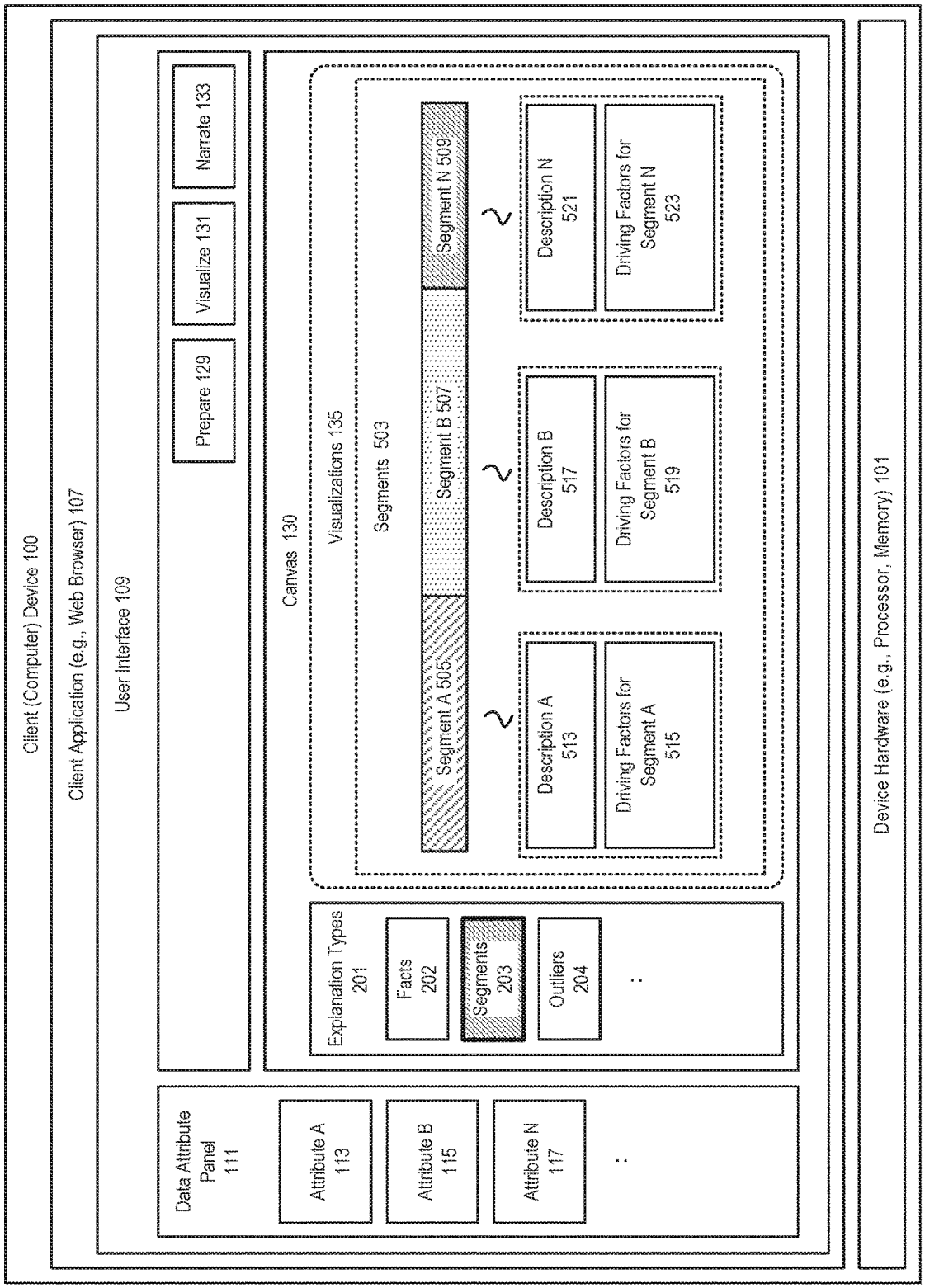
FIG. 15 further illustrates a data visualization environment that uses machine learning to enable graphical display of information associated with a set of data, including automatic insight of segments, in accordance with an embodiment.

FIG. 15 further illustrates a data visualization environment that uses machine learning to enable graphical display of information associated with a set of data, including automatic insight of segments, in accordance with an embodiment.

As illustrated in FIG. 15, in accordance with an embodiment, a plurality of segments 503 are identified, with three segments showing "no attrition" and the three segments showing "attrition".

In accordance with the illustrated example, the user interface displays a segment A 505, segment B 507, and segment N 509. Each of the segments can be associated with a description, and a plurality of driving factors for the target attribute, such as attribute A in this example.

For example, segment A can be associated with description A 513 and driving factors A 515. Segment B can be associated with description B 517 and driving factors B 519. Segment N can be associated with description N 521 and driving factors N 523.

Figure 16:
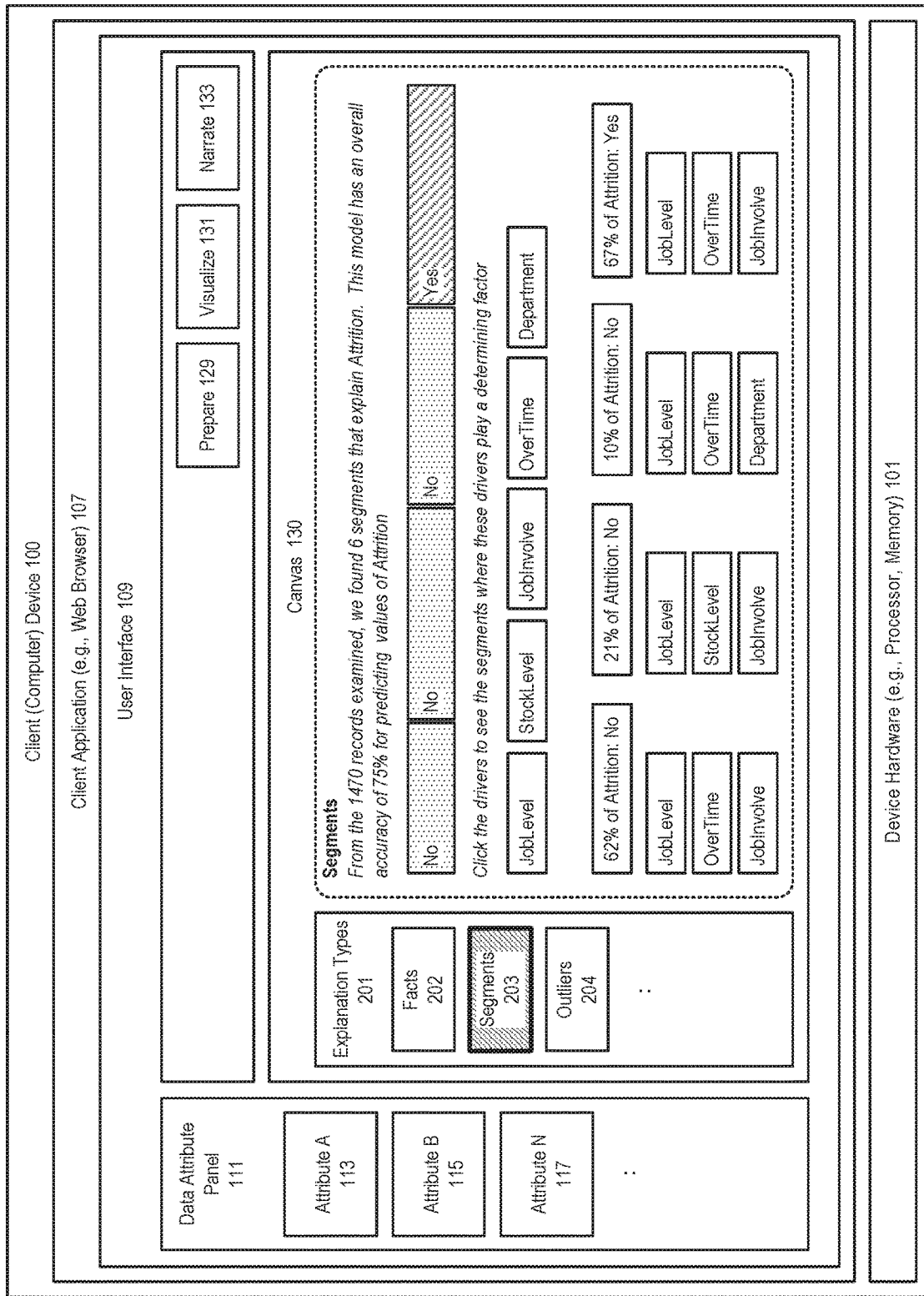
FIG. 16 illustrates an example of how the data visualization environment graphically displays visualizations or other information associated with a set of data, including automatic insight of segments, in accordance with an embodiment.

FIG. 16 illustrates an example of how the data visualization environment graphically displays visualizations or other information associated with a set of data, including automatic insight of segments, in accordance with an embodiment.

As illustrated in FIG. 16, in accordance with an embodiment, for each segment showing no attrition, the system can display a description section with the percentage of "no attrition" for the segment, and a confidence level; and a driving factors section with different driving factors for the target attribute. Similarly, a description section and a driving factors section are illustrated for each segment showing "attrition". Some of the driving factors section and description sections are illustrated.

For example, if a HR person needs to identify driving factors for explaining the attribute "job attrition" in the United States from a given data set, any rows related to other countries can be removed from the data set.

In this example, for each data segment showing "no attrition", there is a description section showing the percentage of the data segment in the total observations of "no attrition" (e.g., 62%, 21%, and 16%), and a confidence level.

The description section for each data segment showing "no attrition" also illustrates driving factors for the target attribute.

Figure 17:
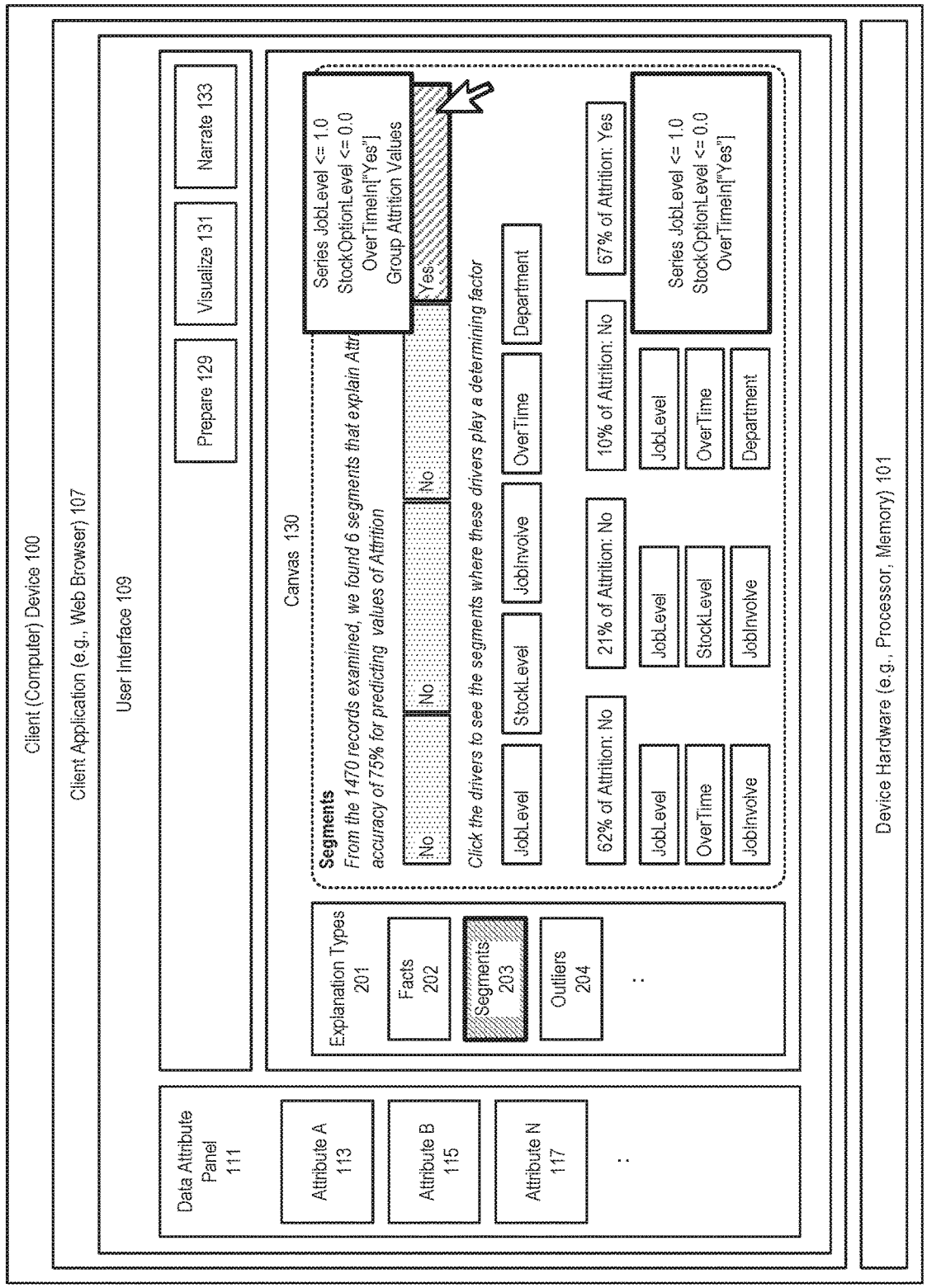
FIG. 17 further illustrates an example of how the data visualization environment graphically displays visualizations or other information associated with a set of data, including automatic insight of segments, in accordance with an embodiment.

FIG. 17 further illustrates an example of how the data visualization environment graphically displays visualizations or other information associated with a set of data, including automatic insight of segments, in accordance with an embodiment.

As illustrated in FIG. 17, in accordance with an embodiment, when a user moves a cursor over a particular data segment or a driving factors section, additional detailed information for the particular data segment can be displayed.

Figure 18:
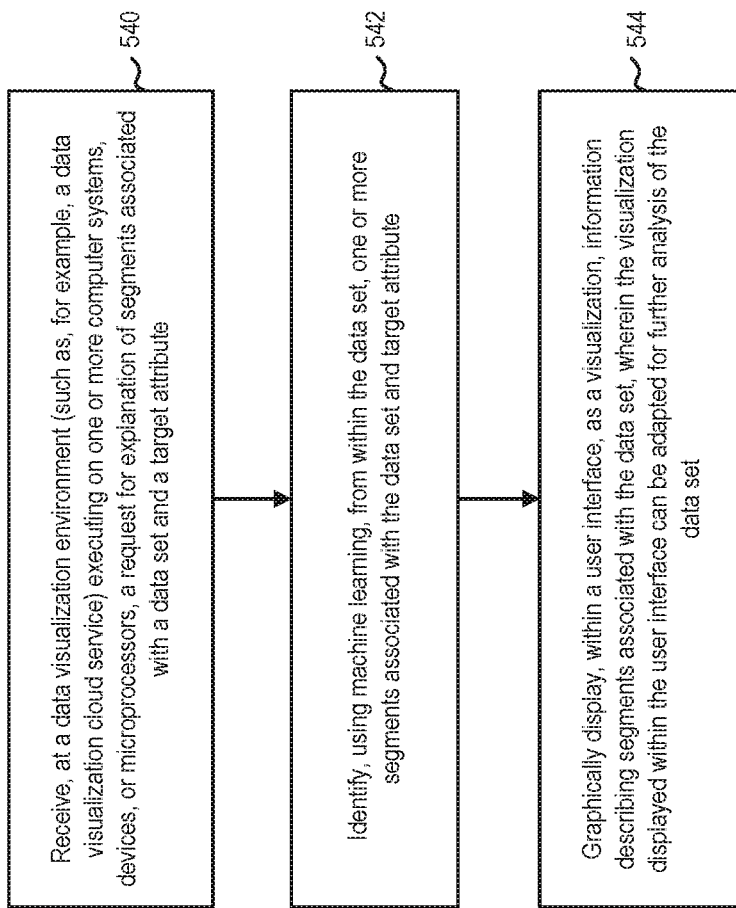
FIG. 18 illustrates a method by which a data visualization environment uses machine learning to enable graphical display of information associated with a set of data, including automatic insight of segments, in accordance with an embodiment.

FIG. 18 illustrates a method by which a data visualization environment uses machine learning to enable graphical display of information associated with a set of data, including automatic insight of segments, in accordance with an embodiment.

As illustrated in FIG. 18, in accordance with an embodiment, at step 540, the system receives, at a data visualization environment (such as, for example, a data visualization cloud service) executing on one or more computer systems, devices, or microprocessors, a request for explanation of segments associated with a data set and a target attribute.

At step 542, the system identifies, using a machine learning process, from within the data set, one or more segments associated with the data set and target attribute.

At step 544, the system graphically displays, within a user interface, as a visualization, information describing segments associated with the data set, wherein the visualization displayed within the user interface can be adapted for further analysis of the data set.

Figure 19:
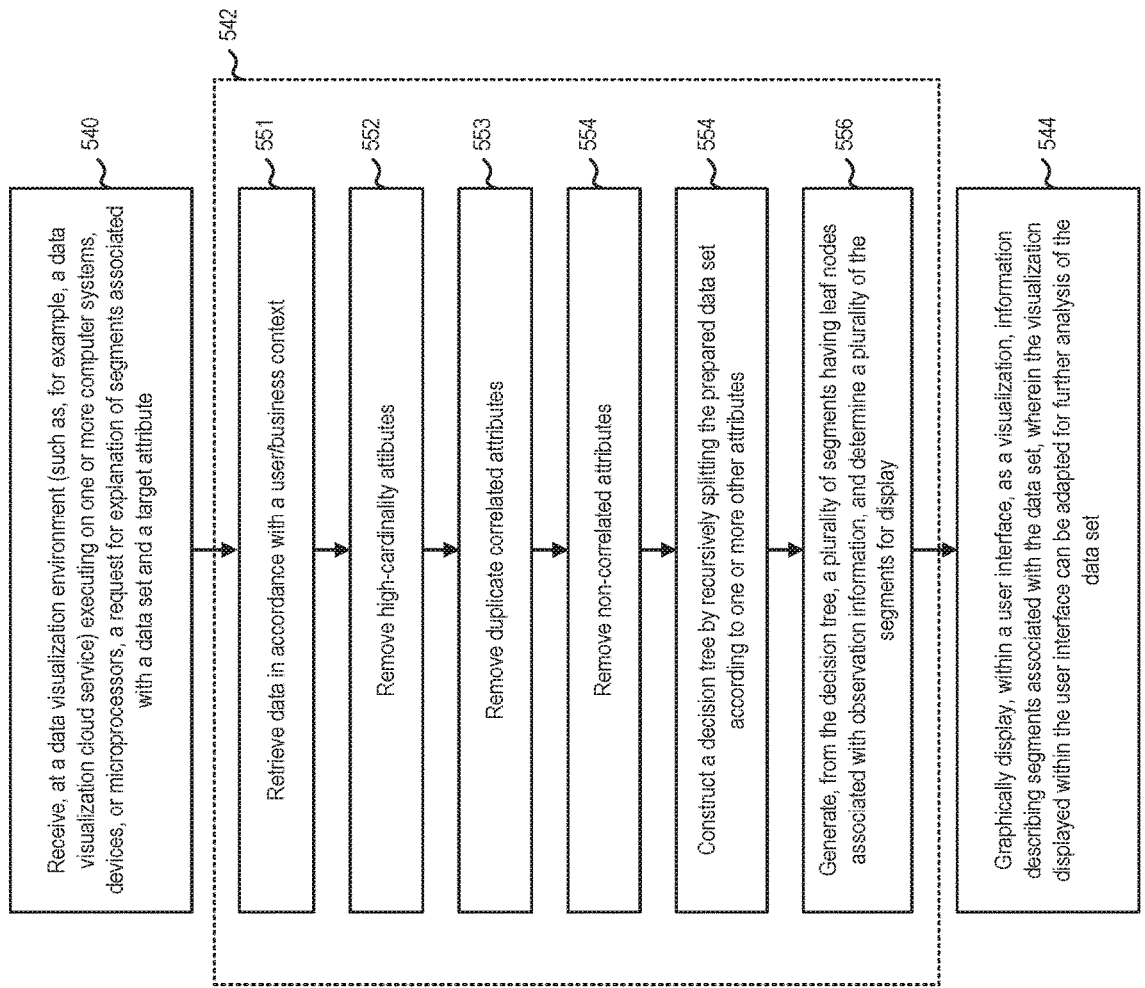
FIG. 19 further illustrates a method by which a data visualization environment uses machine learning to enable graphical display of information associated with a set of data, including automatic insight of segments, in accordance with an embodiment.

FIG. 19 further illustrates a method by which a data visualization environment uses machine learning to enable graphical display of information associated with a set of data, including automatic insight of segments, in accordance with an embodiment.

As illustrated in FIG. 19, in accordance with an embodiment, at steps 551-554 (similar with steps 451-455 of the above-described method), data is retrieved into the system in accordance with a user/business context; high-cardinality attributes are removed; duplicate correlated attributes are removed; and non-correlated attributes are removed.

At step 555, a decision tree is constructed by recursively splitting the prepared data set according to one or more other attributes.

At step 556, a plurality of segments having leaf nodes associated with observation information can be generated or otherwise determined from the decision tree, and a plurality of the segments determined for display.

Automatic Insight of Outliers

In accordance with an embodiment, the system can use a machine learning process to automatically determine one or more outliers or findings within the data, based on, for example, determining a plurality of combinations representing pairs of attribute dimensions within a data set, from which a general explanation or pattern can be determined for one or more attributes, and then comparing particular values for attributes, with the determined pattern for those attributes. Information describing such outliers or findings can be graphically displayed at a user interface, as text, graphs, charts, or other types of visualizations, and used as a starting point for further analysis of the data set.

Although the above-described determination of driving factors and segments provides useful information with regard to explaining a given attribute within a data set, in many situations it is also useful to determine outliers, surprises, abnormalities, or findings that do not fall into a general pattern.

For example, as might be encountered with a set of human resources data, it may be useful for a manager to review any surprising or outlier attributes associated with those employees who have left a company, since those attributes can provide starting points to evaluate employee profiles for purposes of employee retention.

Generally described, in accordance with an embodiment, the system enables a user to select an attribute of interest, for which the system can then automatically determine, in accordance with a user/business context, and a model or understanding of the data, one or more outliers of data pertinent to the target attribute. The outlier information can then be expressed as dynamically updated set of findings regarding the data, with accompanying visualizations.

In accordance with an embodiment, the system can receive an attribute of interest, examine each attribute within the dataset, and generate a plurality of combinations, each combination representing a pair of attribute dimensions. The plurality of combinations can be summarized to create a matrix that represents the data set as a whole. Using the matrix, a general explanation or pattern can be generated for one or more attributes in the data set. One or more outliers, surprises, abnormalities, or findings can then be identified by comparing a general pattern with rows or attributes in the data set.

In accordance with an embodiment, in calculating a general pattern or identifying outliers, the system can consider many or all of the attributes in a data set. Since in such instances, the calculation process may be slow for a large data set, in accordance with an embodiment, the calculations performed by the data visualization cloud service can be pushed down, via a business intelligence server, to one or more computation engines in one or more of the plurality of data source(s), for example, a database, Spark SQL, or data storage service.

In accordance with an embodiment, the system can also accommodate data sparsity, for example, by using aggregate data values instead of individual data values.

In accordance with an embodiment, while the system operates to determine outliers, one or more of the outliers so determined can be displayed initially within the user interface, as they are identified.

Subsequently, as additional outliers are identified (including perhaps more interesting outliers that deviate from the general pattern by a greater margin), the system can, in accordance with an embodiment, automatically refresh the user interface to display those additional outliers, and replace the initially-displayed outliers. In this manner, the system can dynamically display, for example, the top n (e.g., ten, twenty) findings associated with a current data set.

Figure 20:
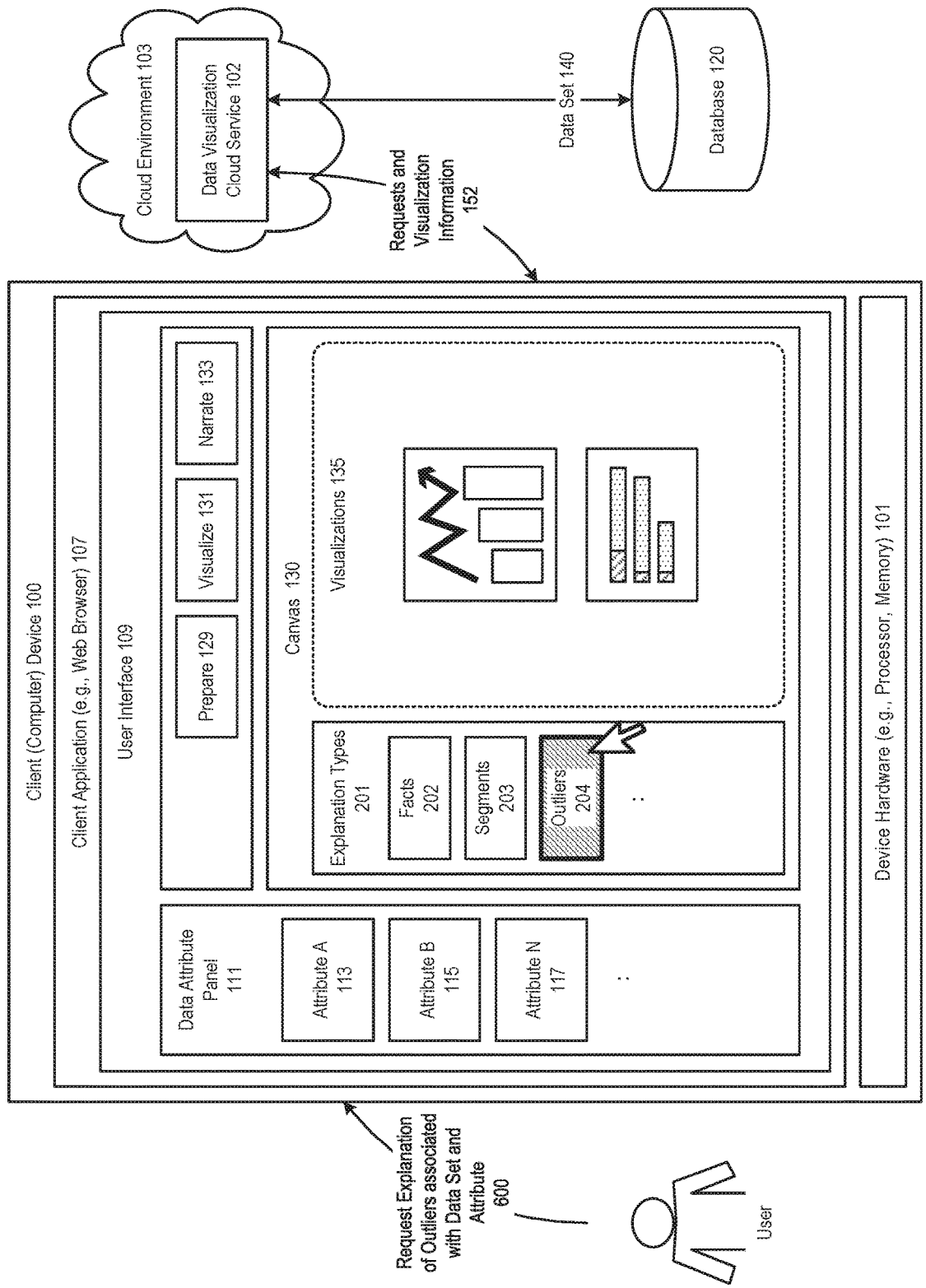
FIG. 20 illustrates a data visualization environment that uses machine learning to enable generation and graphical display of visualizations or other information associated with a set of data, including automatic insight of outliers, in accordance with an embodiment.

FIG. 20 illustrates a data visualization environment that uses machine learning to enable generation and graphical display of visualizations or other information associated with a set of data, including automatic insight of outliers, in accordance with an embodiment.

As illustrated in FIG. 20, in accordance with an embodiment, a user can issue a request for explanation of outliers associated with a data set and attribute 600.

Figure 21:
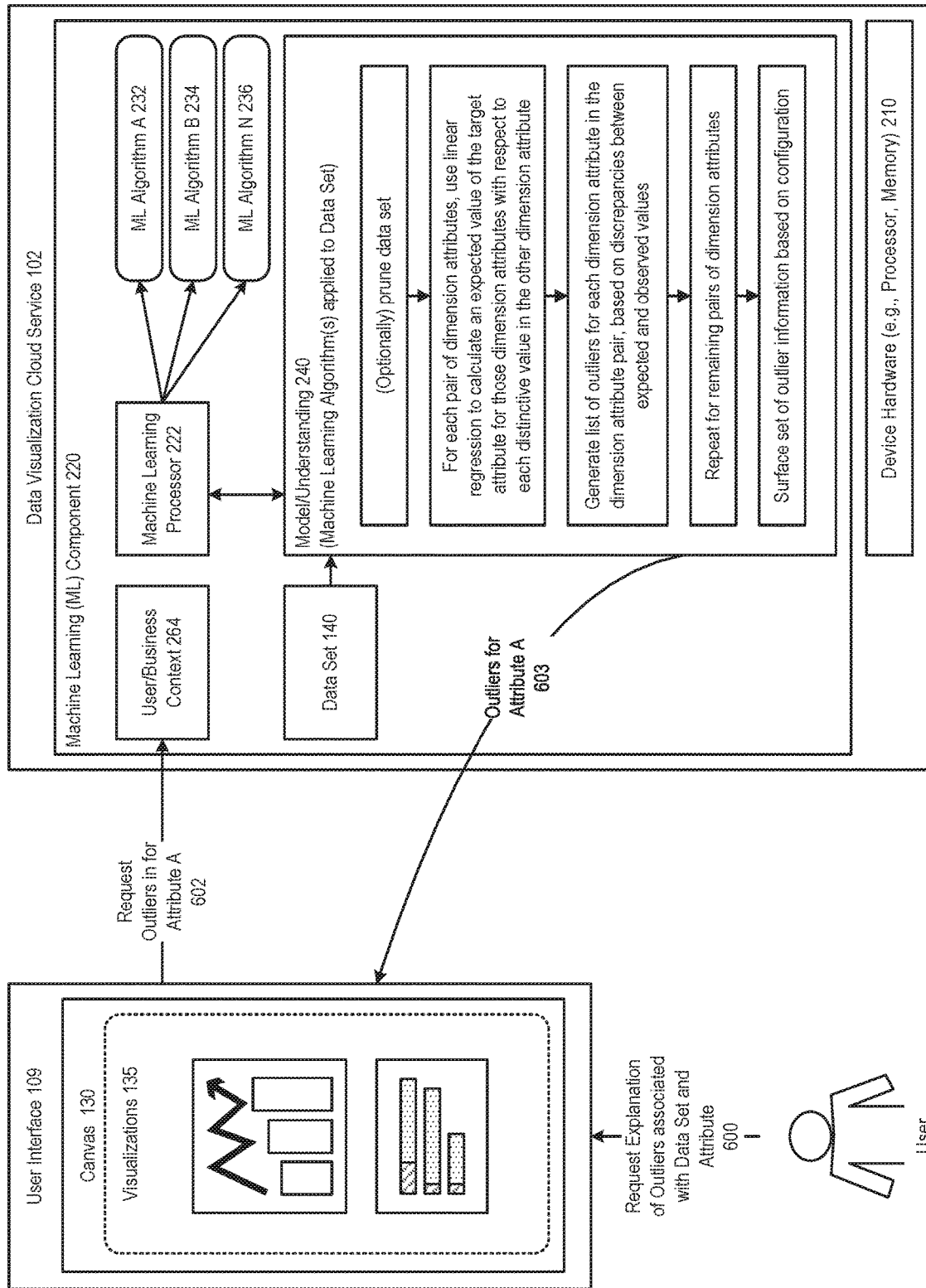
FIG. 21 further illustrates a data visualization environment that uses machine learning to enable graphical display of information associated with a set of data, including automatic insight of outliers, in accordance with an embodiment.

FIG. 21 further illustrates a data visualization environment that uses machine learning to enable graphical display of information associated with a set of data, including automatic insight of outliers, in accordance with an embodiment.

As illustrated in FIG. 21, in accordance with an embodiment, the request for outliers associated with, for example, attribute A 602, can be communicated to the data visualization cloud service, which applies a machine learning algorithm to determine the outliers for attribute A 603.

In accordance with an embodiment, the system can optionally prune the data set; and then, for each pair of dimension attributes, uses a linear regression process to calculate an expected value of the target attribute for those dimension attributes with respect to each distinctive value in the other dimension attribute.

In accordance with an embodiment, the system can then generate a list of outliers for each dimension attribute in the pair of attribute dimensions, based on discrepancies between expected and observed values; repeats the process for remaining pairs of dimension attributes; and surfaces a set of outlier information surface based on a system or user configuration.

Figure 22:
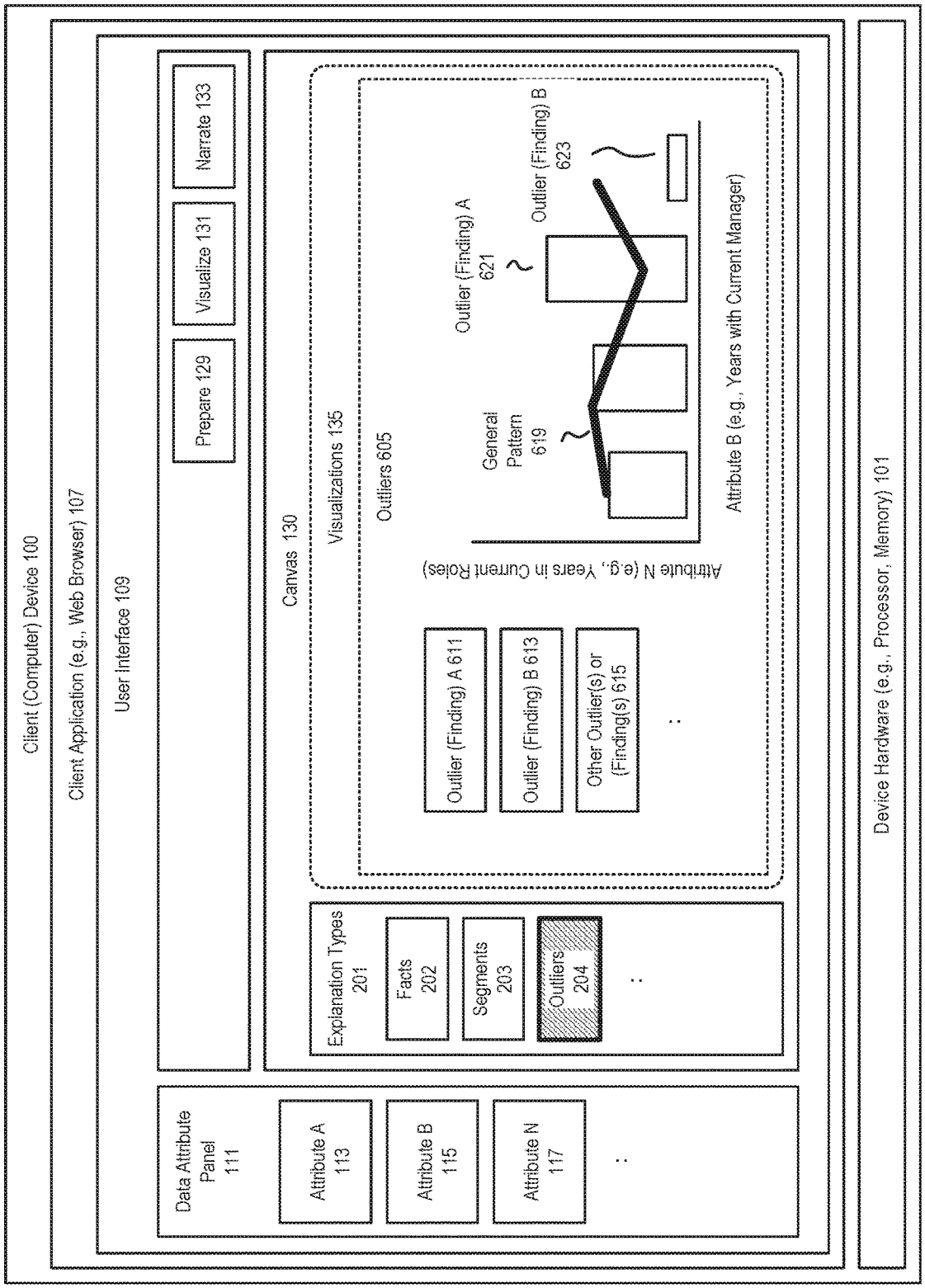
FIG. 22 further illustrates a data visualization environment that uses machine learning to enable graphical display of information associated with a set of data, including automatic insight of outliers, in accordance with an embodiment.

FIG. 22 further illustrates a data visualization environment that uses machine learning to enable graphical display of information associated with a set of data, including automatic insight of outliers, in accordance with an embodiment.

As illustrated in FIG. 22, in accordance with an embodiment, a plurality of outliers 605 can be identified by the data visualization cloud service, including for example, outlier A 611 and outlier B 613, each of which can be associated with a visualization 621, 623 respectively. Each outlier can represent an attribute, a measure, or a data segment in a given data set.

In accordance with an embodiment, data describing one or more additional outliers or findings 615 can be dynamically generated. For example, as described above, one or more of the outliers can be displayed initially within the user interface, as they are identified; and subsequently, as additional outliers are identified, the system can automatically refresh the user interface to display those additional outliers, and replace the initially-displayed outliers.

In accordance with an embodiment, the outliers can be generated or otherwise determined by comparing an attribute, a measure, or data segment against a general pattern 619, in response to the user requesting explanation associated with a particular attribute using outliers. For example, each outlier can represent an attribute, a measure, or a data segment that has a large deviation from the general pattern or value.

In accordance with an embodiment, the general pattern or value can be generated based on the given data set. The number of outliers to be displayed, and the criteria for identifying the outliers, can be set by configurable parameters by users.

In accordance with an embodiment, the system can use progressive linear regression to calculate, for each dimension attribute in a pair of dimension attributes, an expected value of the target attribute measure attribute, with respect to each distinctive value in the other dimension attribute of the pair of dimension attributes; and a discrepancy score by comparing the expected value and the observed value for the target attribute measure attribute associated with a particular distinctive value. The scores associated with each of the distinctive values can be ranked, to determine one or more outliers for the pair of dimension attributes.

For example, in accordance with an embodiment, an outlier list can be generated for each dimension attribute, in each pair of attribute dimensions, based on discrepancies between expected values and observed values. One or more outliers in each outlier list can then be displayed graphically in a user interface.

Figure 23:
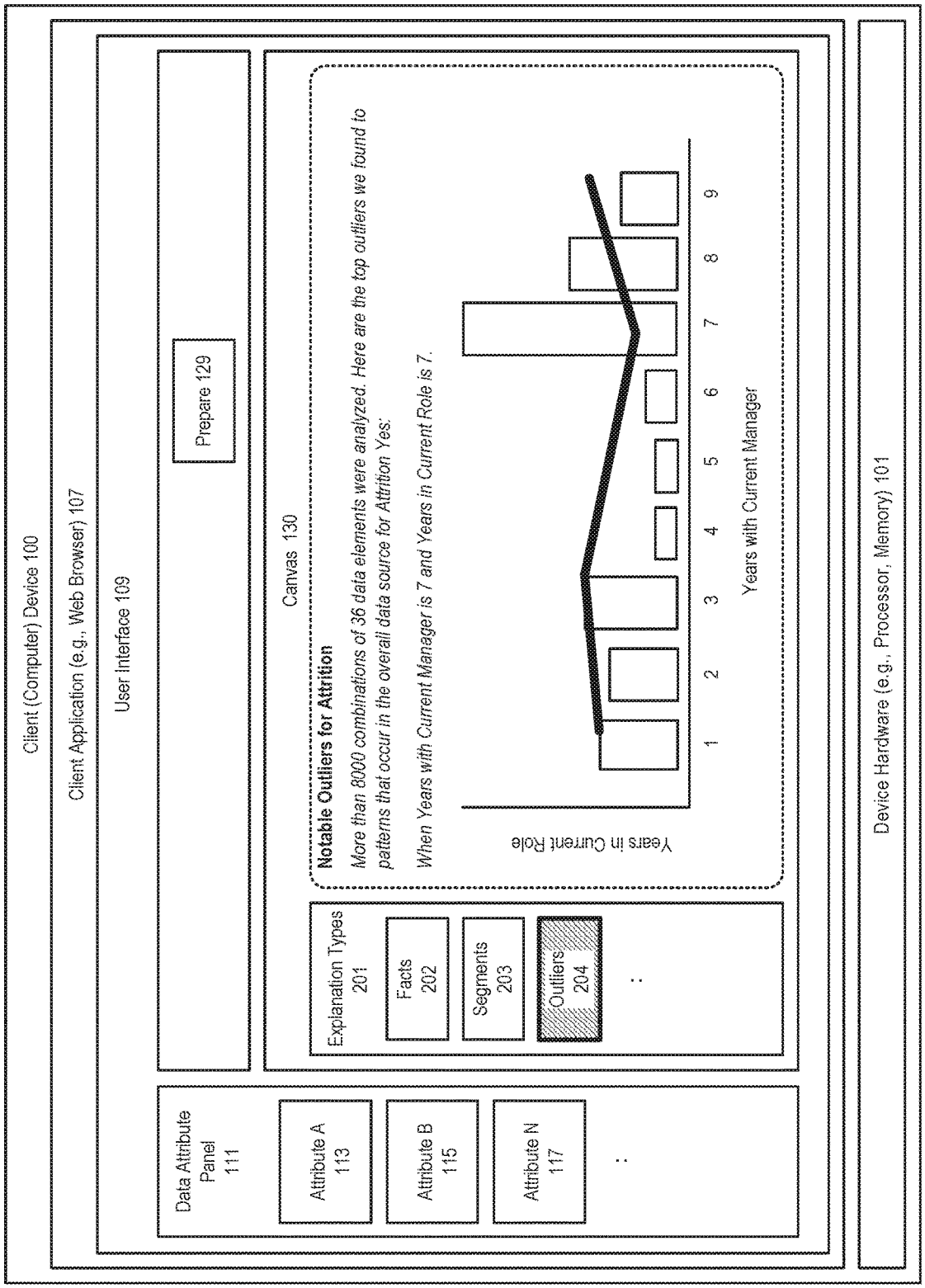
FIG. 23 illustrates an example of how the data visualization environment graphically displays visualizations or other information associated with a set of data, including automatic insight of outliers, in accordance with an embodiment.

FIG. 23 illustrates an example of how the data visualization environment graphically displays visualizations or other information associated with a set of data, including automatic insight of outliers, in accordance with an embodiment.

As an illustrative example, a user may need to find outliers from a data set in terms of expenditures on a particular medicine. In accordance with an embodiment, the system can use the processes described herein to create a benchmark that represents a general pattern or percentage of total spending on the medicine in total spending on all medicines nationwide, including an expected value for a particular state. In creating the benchmark, the system can examine each attribute in a data set, for example, expenditures for medicine by year, by month, or by pharmacists. A combination of each pair of attribute dimensions can be generated, and the generated combinations can be summarized to create a nationwide average spending. The system can then determine if any segments of data are outliers in comparison to the nationwide average spending.

As illustrated in FIG. 23, in this example, the generated visualization illustrates that the total expenditure on the medicine Esomeprazole Magnesium (heartburn) in Texas accounts for 3.4% of the total expenditure on medicines in the state; which represents a large deviation from the nationwide percentage of 2.3%.

Similarly, other states or other attributes can be identified as outliers. The outliers can represent opportunities for companies that sell the medicine. For example, a company may want to increase their efforts to sell the medicine in Texas.

Figure 24:
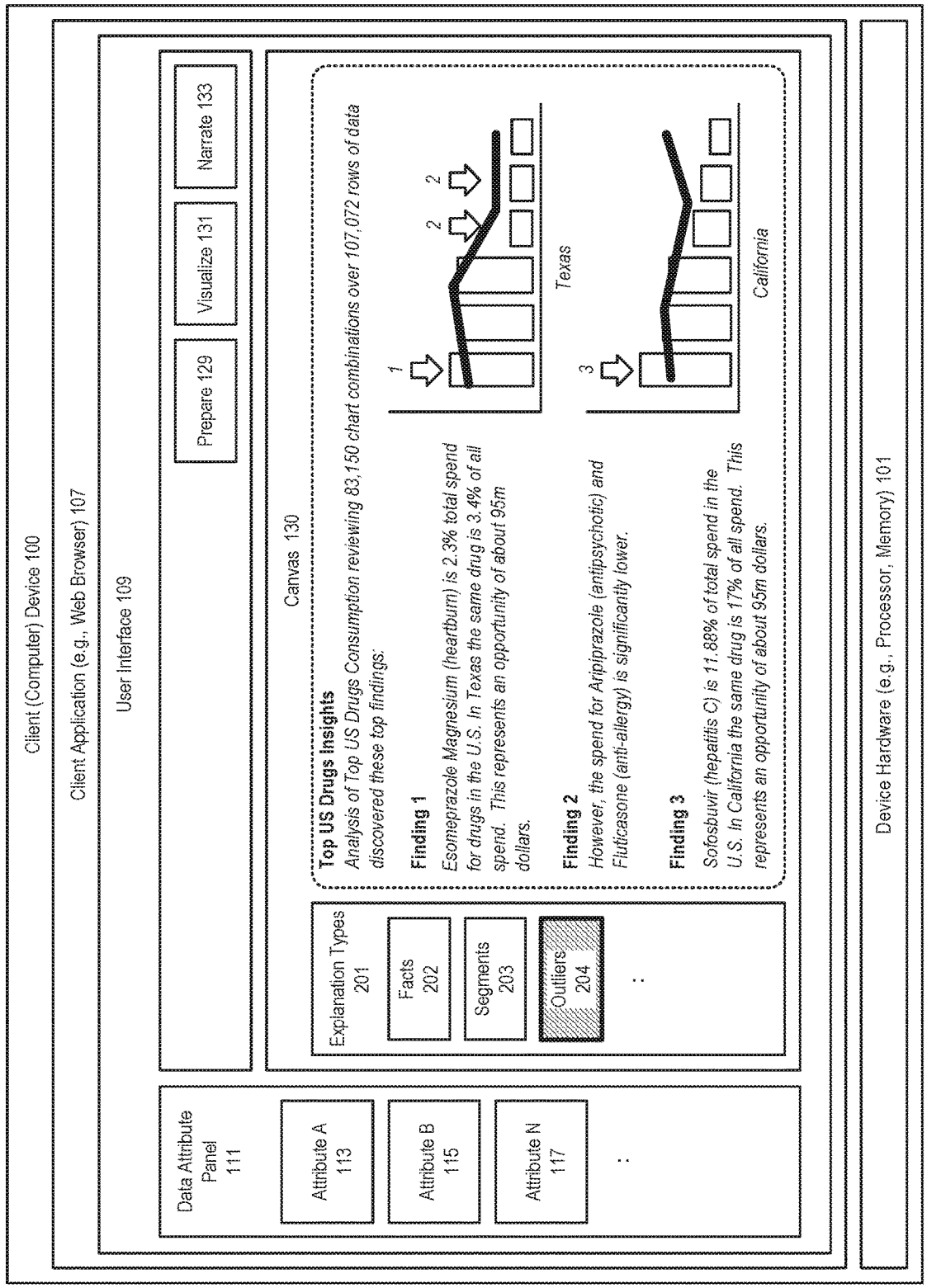
FIG. 24 further illustrates an example of how the data visualization environment graphically displays visualizations or other information associated with a set of data, including automatic insight of outliers, in accordance with an embodiment.

FIG. 24 further illustrates an example of how the data visualization environment graphically displays visualizations or other information associated with a set of data, including automatic insight of outliers, in accordance with an embodiment.

As illustrated in FIG. 24, in accordance with an embodiment as might be encountered with a set of human resources data, the system can, for example, identify an outlier which represents an abnormality when employment years in a current role is 7, and years with a current manager is 7. As illustrated, the attrition rate for this data segment (about 14 employees) is about 10 times the expected rate for the data set.

Figure 25:
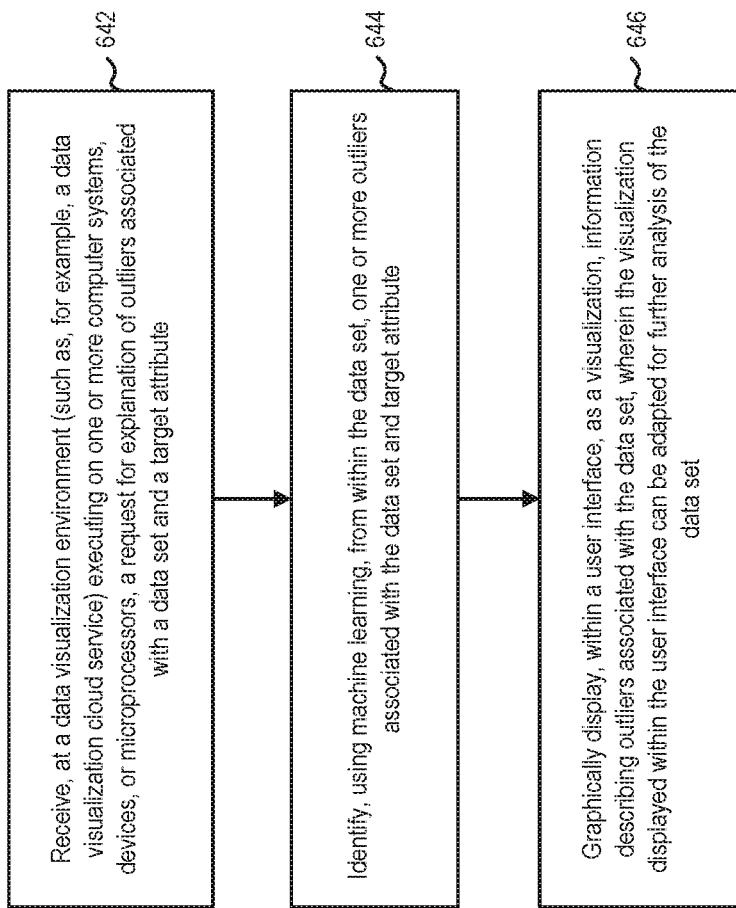
FIG. 25 illustrates a method by which a data visualization environment uses machine learning to enable graphical display of information associated with a set of data, including automatic insight of outliers, in accordance with an embodiment.

FIG. 25 illustrates a method by which a data visualization environment uses machine learning to enable graphical display of information associated with a set of data, including automatic insight of outliers, in accordance with an embodiment.

In accordance with an embodiment, at step 642, the system receives, at a data visualization environment (such as, for example, a data visualization cloud service) executing on one or more computer systems, devices, or microprocessors, a request for explanation of outliers associated with a data set and a target attribute.

At step 644, the system identifies, using a machine learning process, from within the data set, one or more outliers associated with the data set and target attribute.

At step 646, the system graphically displays, within a user interface, as a visualization, information describing outliers associated with the data set, wherein the visualization displayed within the user interface can be adapted for further analysis of the data set.

Figure 26:
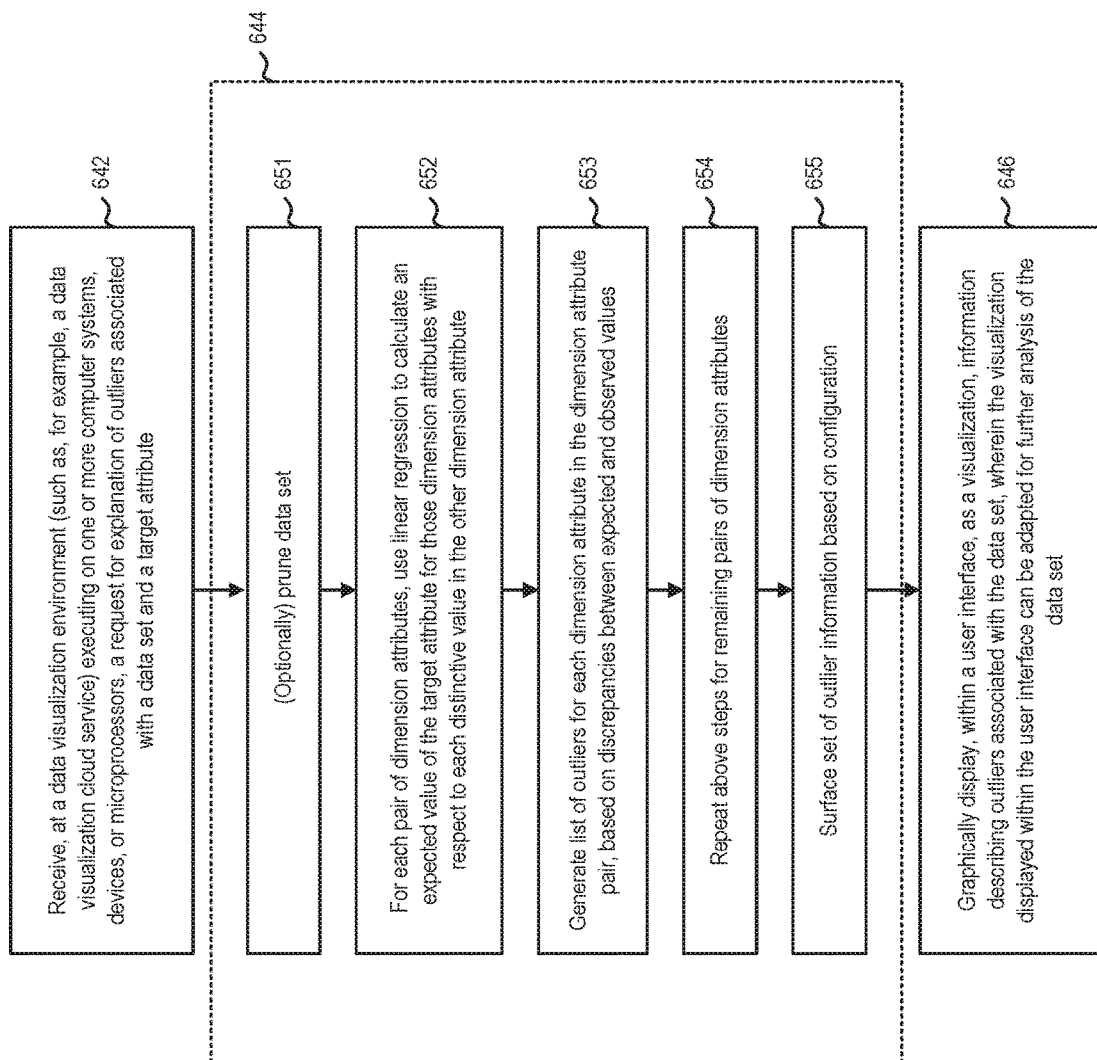
FIG. 26 further illustrates a method by which a data visualization environment uses machine learning to enable graphical display of information associated with a set of data, including automatic insight of outliers, in accordance with an embodiment.

FIG. 26 further illustrates a method by which a data visualization environment uses machine learning to enable graphical display of information associated with a set of data, including automatic insight of outliers, in accordance with an embodiment.

As illustrated in FIG. 26, at step 651 the system (optionally) prunes the data set.

At step 652, for each pair of dimension attributes, linear regression is used to calculate an expected value of the target attribute for those dimension attributes with respect to each distinctive value in the other dimension attribute.

At step 653, a list of outliers is generated for each dimension attribute in the pair of attribute dimensions, based on discrepancies between expected and observed values.

At step 654, the above steps are repeated for remaining pairs of dimension attributes.

At step 655, a set of outlier information is surfaced based on configuration.

For example, the outliers from one or more outlier lists can be output to the user interface based on user configurations, and graphically displayed in a canvas in the user interface associated with a client application.

In accordance with an embodiment, the following example illustrates, together with portions of a sample Python script, how in one embodiment, the system can identify outliers within a data set using for example, a Singular Value Decomposition (SVD) technique.

In accordance with an embodiment, the system receives an indication of a target attribute for which outliers are to be determined:

```
def EvaluateSurprise(df,x,y,target attribute,method):
if method == 'LinearRegression': ComputeClass = LinearRegression
else: ComputeClass = Ridge
#total=numpy.sum(df[target attribute])
```

In accordance with an embodiment, the system generates a dictionary of unique values in a first dimension of a given data set:

```
g1= df.groupby(x)[target attribute].sum( )
g1=g1.reset_index( )
xIndex=[ ]
xIndexRev=[ ]
numXValues=0
for k in g1.iterrows( ):
if k[1] [x] not in xIndex:
xIndex[k[1][x]]=numXValues
xIndexRev[numXValues] = k[1][x]
numXValues+=1
```

In accordance with an embodiment, the system generates a dictionary of unique values in a second dimension of the given data set:

```
g2= df.groupby(y) [target attribute].sum( )
g2=g2.reset_index( )
yIndex=[ ]
yIndexRev=[ ]
numYValues=0
for k in g2.iterrows( ):
if k[1][y] not in yIndex:
yIndex[k[1][y]]=numYValues
yIndexRev[numYValues] = k[1][y]
numYValues+=1
#print("X,Y before reduction: ", numXValues, numYValues)
if numXValues==0 or numYValues==0: return [ ]
```

In accordance with an embodiment, the system generates a set of target attributes by grouping the first dimension and second dimension. The set can be, for example, a set of rows that contain the target attribute. If a row does not contain the target attribute, then that row can be excluded from the row set:

```
jointDist= df.groupby((x,y))[target attribute].sum( )
jointDist=jointDist.reset_index( )
```

In accordance with an embodiment, the system will reject those dimensions for which there is not enough combinations to make a constant configurable:

```
if jointDist.shape[0]<=max(numXValues, numYValues)*1.5:
print ("rejecting ",x,y)
return [ ]
else:
pass
print("Accepting ",x,y,numXValues, numYValues, jointDist.shape[0])
```

In accordance with an embodiment, the system generates a dictionary, and a reverse dictionary, of unique values in both the first dimension and second dimension, that are actually in the group-by:

```
xIndex=[ ]
xIndexRev=[ ]
yIndex=[ ]
yIndexRev=[ ]
numXValues=0
numYValues=0
for k in jointDist.iterrows( ):
    if k[1][x] not in xIndex:
xIndex[k[1][x]]=numXValues
xIndexRev[numXValues] =k[1][x]
numXValues+=1
if k[1][y] not in yIndex:
yIndex[k[1][y]]=numYValues
yIndexRev[numYValues] = k[1][y]
numYValues+=1
print("X,Y after reduction: ", numXValues, numYValues)
xFactor=numpy.zeros((numXValues,1))+1000
yFactor=numpy.zeros((1,numYValues))+1000
Xindexes ={ xv : xIndex[xv]+1 for xv in xIndex.keys( ) }
Yindexes ={ yv : yIndex[yv]+1 for yv in yIndex.keys( ) }
```

In accordance with an embodiment, the system perform loops as defined by the number of unique values in the first dimension. The loop can stop when a convergence factor is encountered or a timeout occurs. The system also generates a variance and covariance for each unique value in the first dimension and the second dimension. Each variance or covariance can be computed by comparing the unique value with a target attribute value calculated using a pre-configured constant divisor:

```
for loop in range(0,4):
covariances = { }
variances = { }
for j in jointDist.iterrows( ):
currX = j[1][x]
currY = j[1][y]
currTarget attribute = j[1][target attribute]/CONSTANT_DIVISOR
if currX not in covariances:
covariances[currX] = 0
variances[currX] = 0
```

```
covariances[currX] += currTarget attribute * Yindexes[currY]
variances [currX] += Yindexes[currY] * Yindexes[currY]
Xindexes = {a : covariances[a]/variances[a] for a in covariances}
covariances = { }
variances = { }
for j in jointDist.iterrows( ):
currX = j[1][x]
currY = j[1][y]
currTarget attribute = j[1] [target attribute]/CONSTANT_DIVISOR
if currY not in covariances:
covariances[currY] = 0
```

```
variances[currY] = 0
covariances[currY] += currTarget attribute * Xindexes[currX]
variances[currY] += Xindexes[currX] * Xindexes[currX]
Yindexes = {a : covariances[a]/variances[a] for a in covariances}
xError={ }
yError={ }
xSum={ }
ySum={ }
```

In accordance with an embodiment, the system generates an expected value from the variances and covariances:

```
predicted_values = [ ]
for j in jointDist.iterrows( ):
currX = j[1][x]
currY = j[1][y]
currTarget attribute = j[1] [target attribute]/CONSTANT_DIVISOR
actual = currTarget attribute
predicted = Xindexes[currX] * Yindexes[currY]
print(currX, currY, actual, predicted)
#print(xIndexRev[xIndex[j[1][x]]], yIndexRev[yIndex[j[1][y]]], j[1][target attribute],
predicted*CONSTANT_DIVISOR)
predicted_values[currX, currY] = predicted*CONSTANT_DIVISOR
error=(actual-predicted)
if currX not in xError:
xError[currX]=xSum[currX]=0
if currY not in yError:
yError[currY]=ySum[currY]=0
xError[currX]+=error*error
yError[currY]+=error*error
xSum[currX]+=actual
ySum[currY]+=actual
surprises = [ ]
```

In accordance with an embodiment, the system can then generate data describing one or more outliers, surprises, abnormalities, or findings, which can be filtered if appropriate:

```
for filter in xError.keys( ):
if not numpy.isnan(xError[filter]):
surprises[(x,filter,y,xError[filter])] = [ ]
current_surprise_rowlist = [ ]
for row in jointDist.iterrows( ):
if row[1][x] == filter:
current_surprise_rowlist.append((xError[filter], fialter, row[1][y], row[1][target
attribute], predicted_values[(filter, row[1][y])]))
surprises[ (x, filter, y,xError[filter])] .extend(current_surprise_rowlist)
for filter in yError.keys( ):
if not numpy.isnan(yError[filter]):
surprises[ (y,filter,x,yError[filter])] = [ ]
current_surprise_rowlist = [ ]
for row in jointDist.iterrows( ):
if row[1][y] == filter:
current_surprise_rowlist.append((yError[filter], filter, row[1][x], row[1][target
attribute], predicted_values[(row[1][x], filter)]))
surprises[(y,filter,x,yError[filter])].extend(current_surprise_rowlist)
return surprises
```

In accordance with an embodiment, the system can update the determination of outliers, surprises, abnormalities, or findings, as appropriate:

```
def GetNewTopNSurprises(topN, all_surprises, df, x, y, target attribute, method):
new_surprises = EvaluateSurprise(df,x,y, target attribute, method)
all_surprises.update(new_surprises)
```

In accordance with an embodiment, the system can also take, for example, a first n (e.g., twenty) items from the sorted surprises, for display:

```
all_surprises_temp = [ ]
item_count = 0
for items in sorted(all_surprises.items( ), key = lambda item : item[0][3], reverse = True):
if item_count < 20:
all_surprises_temp[items[0]] = items[1]
item_count += 1
all_surprises.clear( )
all_surprises.update(all_surprises_temp)
```

The above sample script, routines, and process, is provided by way of example, to illustrate how the system can identify outliers within a data set in accordance with a particular embodiment. In accordance with other embodiments, other types of scripts, programs, routines, or processes, can be used.

Automatic Determination of Machine Learning Algorithms

In accordance with an embodiment, the system can automatically determine, based on, for example, a user/business context and the characteristics of a data set, which machine learning algorithm(s) or parameter values to apply to the data set, in generating visualizations of the data.

For example, in accordance with an embodiment, a particular machine learning algorithm can be selected from a plurality of machine learning algorithms, or the same machine learning algorithm can be applied with different parameter values, and used to generate visualizations for the data set appropriate to the user/business context. The determination or selection of machine learning algorithm(s) or parameter values in rendering visualizations can be based on an examination of the data set itself, without specific input from a user.

Figure 27:
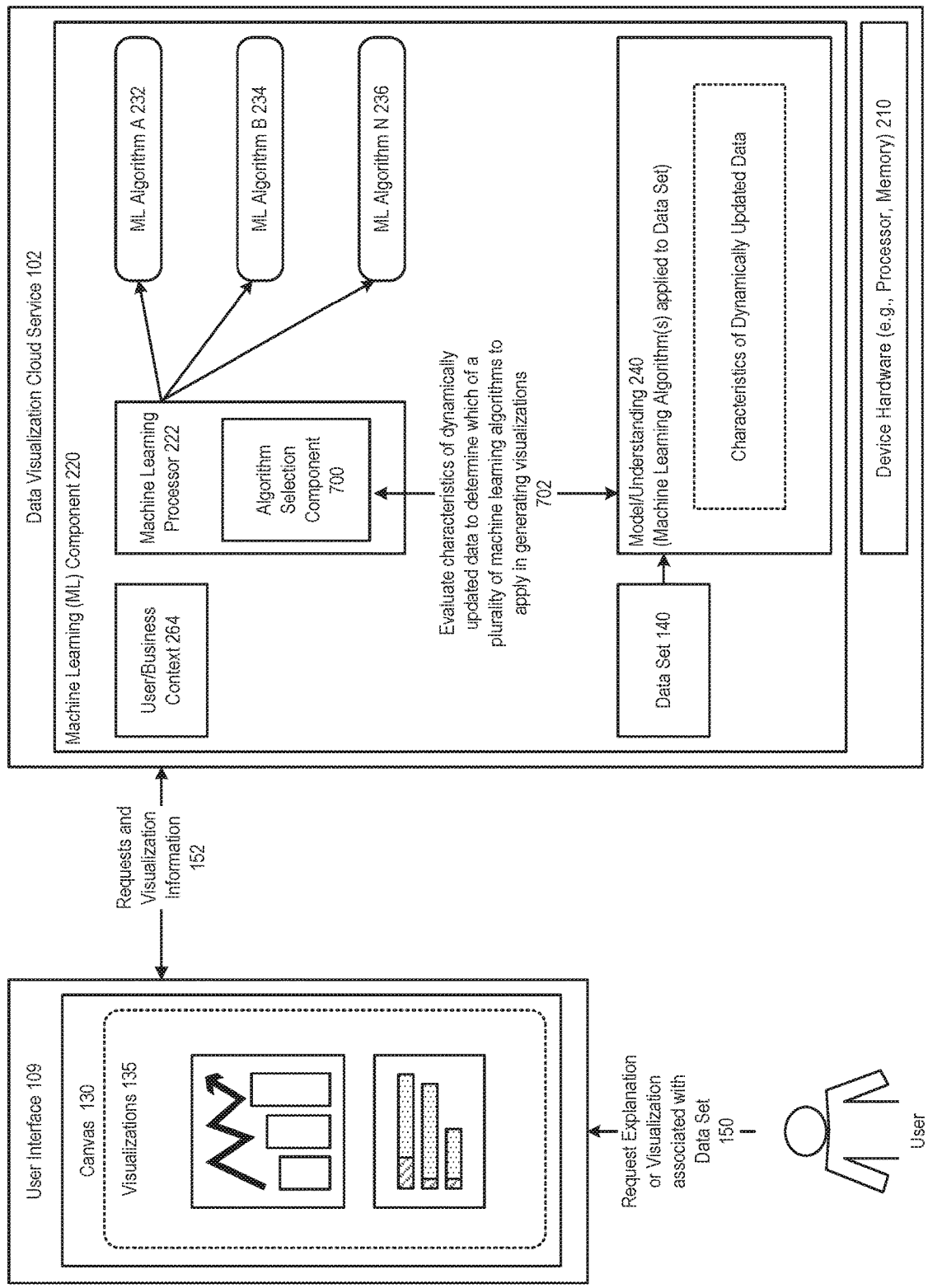
FIG. 27 illustrates a data visualization environment that includes automatic determination of machine learning algorithms to be used in generating visualizations of data sets, in accordance with an embodiment.

FIG. 27 illustrates a data visualization environment that includes automatic determination of machine learning algorithms to be used in generating visualizations of data sets, in accordance with an embodiment.

In accordance with an embodiment, the data set can be dynamically updated, and the rendering of visualizations driven by an examination of real-time data. This allows the system to operate such that, each time a user logs in to the system, a different visualization may be automatically displayed, relevant to the dynamically updated data set, and created according to a different machine learning algorithm, or different parameter values.

As illustrated in FIG. 27, in accordance with an embodiment, the system can include a machine learning algorithm selection component 700 that evaluates characteristics of dynamically updated data, to determine which one or more of a plurality of machine learning algorithms to apply in generating visualizations 702, for subsequent display at a user interface.

In accordance with an embodiment, the machine learning processor, machine learning algorithms, and processes that are used to determine or select the machine learning algorithm, or parameter values, can be implemented as software or computer-readable program code that is executable by a computer system or other processing device.

Figure 28:
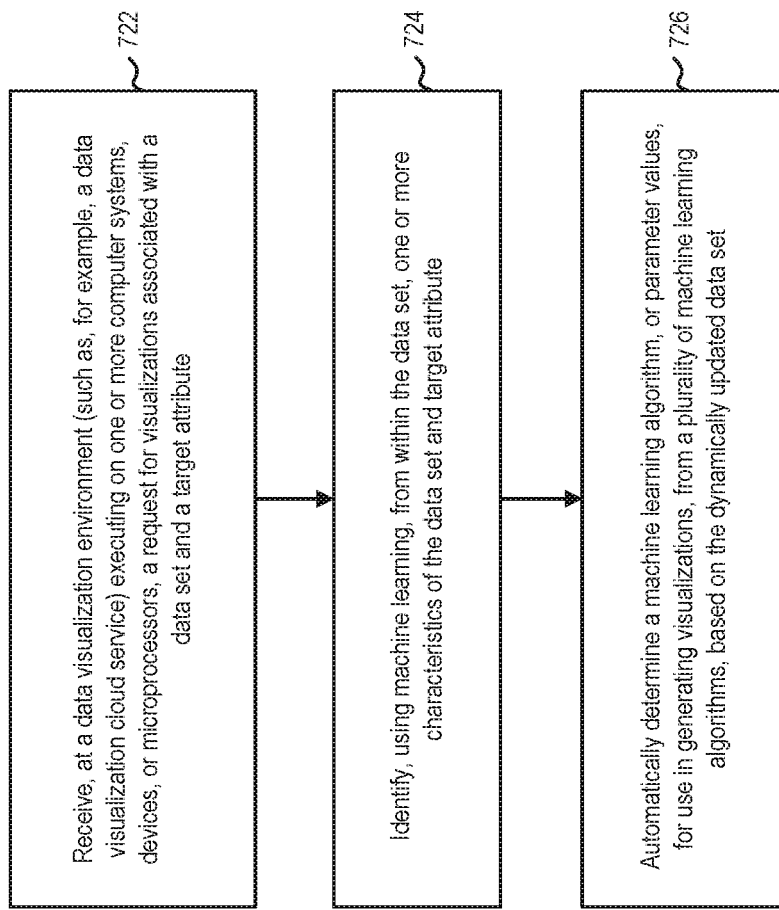
FIG. 28 illustrates a method for automatic determination of machine learning algorithms to be used in generating visualizations of data sets, in accordance with an embodiment.

FIG. 28 illustrates a method for automatic determination of machine learning algorithms to be used in generating visualizations of data sets, in accordance with an embodiment.

As illustrated in FIG. 28, in accordance with an embodiment, at step 722, the system receives, at a data visualization environment (such as, for example, a data visualization cloud service) executing on one or more computer systems, devices, or microprocessors, a request for visualizations associated with a data set and a target attribute.

At step 724, the system identifies, using a machine learning process, from within the data set, one or more characteristics of the data set and target attribute.

At step 726, the system automatically determines a machine learning algorithm, or parameter values, for use in generating visualizations, from a plurality of machine learning algorithms, based on the dynamically updated data set.

Embodiments described herein can be conveniently implemented using one or more conventional general purpose or specialized digital computer, computing device, machine, or microprocessor, or other type of computer, including one or more processors, memory and/or computer-readable storage media programmed according to the teachings of the present disclosure. Appropriate software coding can readily be prepared by skilled programmers based on the teachings of the present disclosure, as will be apparent to those skilled in the software art.

In accordance with some embodiments, features described herein can be implemented, in whole or in part, in a cloud environment, as part of, or as a service of, a cloud computing system which enables on-demand network access to a shared pool of configurable computing resources (e.g., networks, servers, storage, applications, and services), and which can include characteristics, for example, as defined by the National Institute of Standards and Technology, such as: on-demand self-service; broad network access; resource pooling; rapid elasticity; and measured service. Example cloud deployment models can include: public cloud, private cloud, and hybrid cloud; while example cloud service models can include Software as a Service (SaaS), Platform as a Service (PaaS), Database as a Service (DBaaS), and Infrastructure as a Service (IaaS). In accordance with an embodiment, unless otherwise specified, a cloud, as used herein, can encompass public cloud, private cloud, and hybrid cloud embodiments, and all cloud deployment models including, but not limited to, cloud SaaS, cloud DBaaS, cloud PaaS, and cloud IaaS.

In accordance with some embodiments, a computer program product can be provided which is a non-transitory computer-readable storage medium (media) having instructions stored thereon/in, which can be used to program a computer to perform any of the processes described herein. Examples of such storage mediums can include, but are not limited to, hard disk drives, hard disks, hard drives, fixed disks, or other electromechanical data storage devices, floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems, or other types of storage media or devices suitable for non-transitory storage of instructions and/or data.

The foregoing description has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the present teachings and their practical application, thereby enabling others skilled in the art to understand the various embodiments and with various modifications that are suited to the particular use contemplated. It is intended that the scope be defined by the following claims and their equivalents.

What is claimed is:

1. A system for use of machine learning in a data visualization environment, to automatically determine, for a set of data, one or more outliers or findings within the data set, comprising:
    one or more computer systems or devices, including a microprocessor, and a data visualization cloud service executing thereon that provides access to a data set associated with a plurality of attribute dimensions; and
    wherein the data visualization environment, responsive to receiving a request from a client application, to provide an explanation of outliers or findings within the data set, operates according to a machine learning algorithm to:
        determine a plurality of combinations representing pairs of attribute dimensions associated with the data set, from which a general explanation or pattern can be determined for one or more attributes;
        compare particular values for the one or more attributes, with the determined pattern for those attributes, including a process of:
            for each pair of dimension attributes, calculating, for a first dimension attribute, expected values of a target attribute with respect to values associated with a second dimension attribute;
            generating outliers for each dimension attribute in the pair of attribute dimensions, based on discrepancies between the expected values and observed values; and
        provide, to the client application, data describing outliers or findings for the one or more attributes associated the data set which outliers or findings are graphically displayed as visualizations of the data set, and continuing the process for additional pairs of dimension attributes, and providing an indication of additional outliers for display at the user interface.

2. The system of claim 1, wherein the data visualization cloud service is provided within a cloud computing environment, and receives requests from the client application at a client computer system or device, to display visualizations of the data set at the client application.

3. The system of claim 1, wherein a user interface at the client application includes a data attribute panel that enables the client application to display a data set, and to enable drag and drop of attributes to a canvas in the user interface, for use in creating visualizations.

4. The system of claim 1, wherein the data visualization environment operates to:
    for each pair of dimension attributes, use linear regression to calculate an expected value of the target attribute for those dimension attributes with respect to each distinctive value in the other dimension attribute;
    generate a list of outliers for each dimension attribute in the pair of attribute dimensions, based on discrepancies between expected and observed values; and
    surface a set of outlier information.

5. A method for use of machine learning in a data visualization environment, to automatically determine, for a set of data, one or more outliers or findings within the data set, comprising:
    providing at one or more computer systems or devices, including a microprocessor, a data visualization cloud service executing thereon that provides access to a data set associated with a plurality of attribute dimensions; and
    responsive to receiving a request from a client application, to provide an explanation of outliers or findings within the data set:
        determining a plurality of combinations representing pairs of attribute dimensions associated with the data set, from which a general explanation or pattern can be determined for one or more attributes;
        comparing particular values for the one or more attributes, with the determined pattern for those attributes, including a process of:
            for each pair of dimension attributes, calculating, for a first dimension attribute, expected values of a target attribute with respect to values associated with a second dimension attribute;
            generating outliers for each dimension attribute in the pair of attribute dimensions, based on discrepancies between the expected values and observed values; and
        providing, to the client application, data describing outliers or findings for the one or more attributes associated the data set which outliers or findings are graphically displayed as visualizations of the data set, and continuing the process for additional pairs of dimension attributes, and providing an indication of additional outliers for display at the user interface.

6. The method of claim 5, wherein the data visualization cloud service is provided within a cloud computing environment, and receives requests from the client application at a client computer system or device, to display visualizations of the data set at the client application.

7. The method of claim 5, wherein a user interface at the client application includes a data attribute panel that enables the client application to display a data set, and to enable drag and drop of attributes to a canvas in the user interface, for use in creating visualizations.

8. The method of claim 5, wherein the data visualization environment operates to:
    for each pair of dimension attributes, use linear regression to calculate an expected value of the target attribute for those dimension attributes with respect to each distinctive value in the other dimension attribute;
    generate a list of outliers for each dimension attribute in the pair of attribute dimensions, based on discrepancies between expected and observed values; and
    surface a set of outlier information.

9. A non-transitory computer-readable storage medium including instructions stored thereon which when read and executed by one or more computers cause the one or more computers to perform a method comprising:
    responsive to receiving, at a data visualization cloud service that provides access to a data set associated with a plurality of attribute dimensions, a request from a client application, to provide an explanation of outliers or findings within the data set:

determining a plurality of combinations representing pairs of attribute dimensions associated with the data set, from which a general explanation or pattern can be determined for one or more attributes;

comparing particular values for the one or more attributes, with the determined pattern for those attributes, including a process of:

for each pair of dimension attributes, calculating, for a first dimension attribute, expected values of a target attribute with respect to values associated with a second dimension attribute;

generating outliers for each dimension attribute in the pair of attribute dimensions, based on discrepancies between the expected values and observed values; and providing, to the client application, data describing outliers or findings for the one or more attributes associated the data set which outliers or findings are graphically displayed as visualizations of the data set, and continuing the process for additional pairs of dimension attributes, and providing an indication of additional outliers for display at the user interface.

10. The non-transitory computer-readable storage medium of claim 9, wherein the data visualization cloud service is provided within a cloud computing environment, and receives requests from the client application at a client computer system or device, to display visualizations of the data set at the client application.

11. The non-transitory computer-readable storage medium of claim 9, wherein a user interface at the client application includes a data attribute panel that enables the client application to display a data set, and to enable drag and drop of attributes to a canvas in the user interface, for use in creating visualizations.

12. The non-transitory computer-readable storage medium of claim 9, wherein the data visualization environment operates to:

for each pair of dimension attributes, use linear regression to calculate an expected value of the target attribute for those dimension attributes with respect to each distinctive value in the other dimension attribute;

generate a list of outliers for each dimension attribute in the pair of attribute dimensions, based on discrepancies between expected and observed values; and surface a set of outlier information.

* * * * *

UNITED STATES PATENT AND TRADEMARK OFFICE
CERTIFICATE OF CORRECTION

Page 1 of 2

PATENT NO. : 10,832,171 B2
APPLICATION NO. : 16/148680
DATED : November 10, 2020
INVENTOR(S) : Mittal et al.

It is certified that error appears in the above-identified patent and that said Letters Patent is hereby corrected as shown below:

On the Title Page

On page 2, Column 2, item (56) under Other Publications, Line 29, delete "commmunities" and insert -- communities --, therefor.

In the Drawings

On sheet 9 of 28, in FIGURE 9, Line 10, delete "Atttrition" and insert -- Attrition --, therefor.

On sheet 10 of 28, in FIGURE 10, Line 10, delete "Atttrition" and insert -- Attrition --, therefor.

In the Specification

In Column 8, Line 59, delete "65." and insert -- 265. --, therefor.

In Column 8, Line 63, delete "266" and insert -- 266. --, therefor.

In Column 19, Line 42, delete "[ ]" and insert -- { } --, therefor.

In Column 19, Line 43, delete "[ ]" and insert -- { } --, therefor.

In Column 19, Line 57, delete "[ ]" and insert -- { } --, therefor.

In Column 19, Line 58, delete "[ ]" and insert -- { } --, therefor.

In Column 20, Line 30, delete "[ ]" and insert -- { } --, therefor.

In Column 20, Line 31, delete "[ ]" and insert -- { } --, therefor.

In Column 20, Line 32, delete "[ ]" and insert -- { } --, therefor.

Signed and Sealed this
First Day of June, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,832,171 B2

In Column 20, Line 33, delete "[ ]" and insert -- { } --, therefor.

In Column 20, Line 15, delete "[ ]" and insert -- { } --, therefor.

In Column 22, Line 30, delete "[ ]" and insert -- { } --, therefor.

In Column 22, Line 44, delete "failter," and insert -- filter, --, therefor.

In Column 23, Line 4, delete "[ ]" and insert -- { } --, therefor.